United States Patent
Smith

(10) Patent No.: US 10,933,692 B1
(45) Date of Patent: Mar. 2, 2021

(54) WHEEL RIGHTING APPARATUS

(71) Applicant: Delta Air Lines, Inc., Atlanta, GA (US)

(72) Inventor: Michael Wayne Smith, McDonough, GA (US)

(73) Assignee: Delta Air Lines, Inc., Atlanta, GA (US)

(*) Notice: Subject to any disclaimer, the term of this patent is extended or adjusted under 35 U.S.C. 154(b) by 0 days.

(21) Appl. No.: 16/688,239

(22) Filed: Nov. 19, 2019

(51) Int. Cl.
- *B60B 29/00* (2006.01)
- *B66D 3/06* (2006.01)
- *B60B 30/02* (2006.01)

(52) U.S. Cl.
CPC .......... *B60B 29/001* (2013.01); *B60B 30/02* (2013.01); *B66D 3/06* (2013.01)

(58) Field of Classification Search
CPC ........ B60B 30/00; B60B 30/06; B60B 30/02; B60B 3/02; B60B 3/04; B60B 2202/031; B60B 29/002
See application file for complete search history.

(56) References Cited

U.S. PATENT DOCUMENTS

| | | | |
|---|---|---|---|
| 2,359,016 A | 10/1943 | Wood | |
| 2,444,992 A | 7/1948 | Kittel | |
| 2,525,437 A * | 10/1950 | Winzler | B60B 29/002 414/427 |
| 2,640,604 A * | 6/1953 | Curley | B60B 29/002 414/427 |
| 3,441,157 A * | 4/1969 | Kitsuda | B60B 29/002 414/428 |
| 3,830,387 A | 8/1974 | Virnig | |
| 4,050,597 A | 9/1977 | Hawkins | |
| 4,123,038 A | 10/1978 | Meyers | |
| 4,597,711 A * | 7/1986 | Liebermann | B60B 29/002 414/427 |
| 4,776,603 A | 10/1988 | Watts | |
| 7,775,249 B2 * | 8/2010 | Ochoa | B60C 25/01 157/1.1 |
| 8,240,711 B1 | 8/2012 | Horrell et al. | |
| 8,820,756 B2 * | 9/2014 | Hronyetz | B62B 3/02 280/47.34 |
| 9,340,067 B2 * | 5/2016 | Raben | B66C 1/26 |
| 9,475,659 B2 | 10/2016 | Strickland | |

(Continued)

FOREIGN PATENT DOCUMENTS

WO  WO 2002/030747  4/2002

OTHER PUBLICATIONS https://www.kienediesel.com/TIRE-LIFTER_p_24.html (also https://www.ryderfleetproducts.com/kiene-diesel-k-1352/tire-lifter-p-kiek1352) Kiene Diesel Accessories, Inc.—viewed on Dec. 20, 2019.

(Continued)

*Primary Examiner* — Kaitlin S Joerger
(74) *Attorney, Agent, or Firm* — King & Spalding

(57) ABSTRACT

In one embodiment, a wheel righting apparatus includes a main frame and a wheel latching frame that is pivotally coupled to the main frame. The wheel latching frame is configured to be removably coupled to a wheel. The wheel righting apparatus also includes a winch assembly coupled to the main frame. The winch assembly is operable to move the wheel from a horizontal position to a vertical position by pivoting the wheel latching frame relative to the main frame.

17 Claims, 18 Drawing Sheets

(56) References Cited

U.S. PATENT DOCUMENTS 9,783,217 B2 10/2017 Swartling
2016/0068017 A1* 3/2016 Lindgren ................ B60B 30/10
                                                                414/427

OTHER PUBLICATIONS

Wheel Dolly (https://www.grainger.com/product/GRAY-Wheel-Dolly-11N138?cm_sp=Product_Details-_-Products_Based_on_Your_Search-_-IDPPLARECS&cm_vc=IDPPLARECS) Grainger—viewed on Dec. 20, 2019.

* cited by examiner

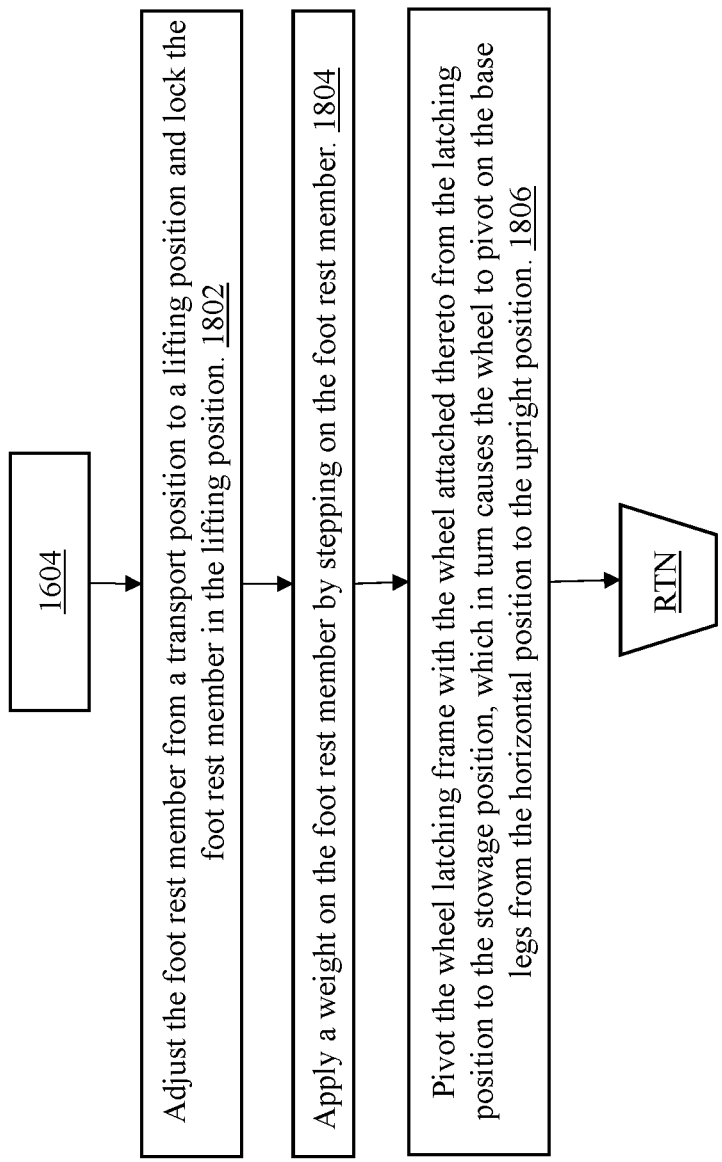

10,933,692 B1

WHEEL RIGHTING APPARATUS

TECHNICAL FIELD

The present disclosure relates generally to wheel handling and, more particularly, to a wheel righting apparatus.

BACKGROUND

Certain vehicles have wheels of a substantial size and weight. For example, an undercarriage wheel of an aircraft may weigh around 500 pounds and have a diameter around 55 inches. Aircraft wheels often are transported and/or serviced in a horizonal position (e.g., laid flat on the floor) and then lifted to an upright position for storage or installation. Aircraft wheels sometimes also need to be lifted when they accidently fall from the upright position to the horizontal position.

Typically, physical exertion and safety concerns require multiple people to work together to manually lift a large wheel from a horizontal position to an upright position. A fork lift also may be used to lift the wheel. However, these options are often undesirable because extra people and forklifts are not always readily available, manual lifting can be dangerous, and components of the forklift could damage the wheel during the lifting process.

BRIEF DESCRIPTION OF THE DRAWINGS

Certain features and aspects of the present disclosure can be better understood with reference to the following description of example embodiments and corresponding drawings, wherein:

FIGS. 16-18 are flowcharts that illustrate an example method of operation of the wheel righting apparatus, in accordance with example embodiments of the present disclosure.

Figure 1:
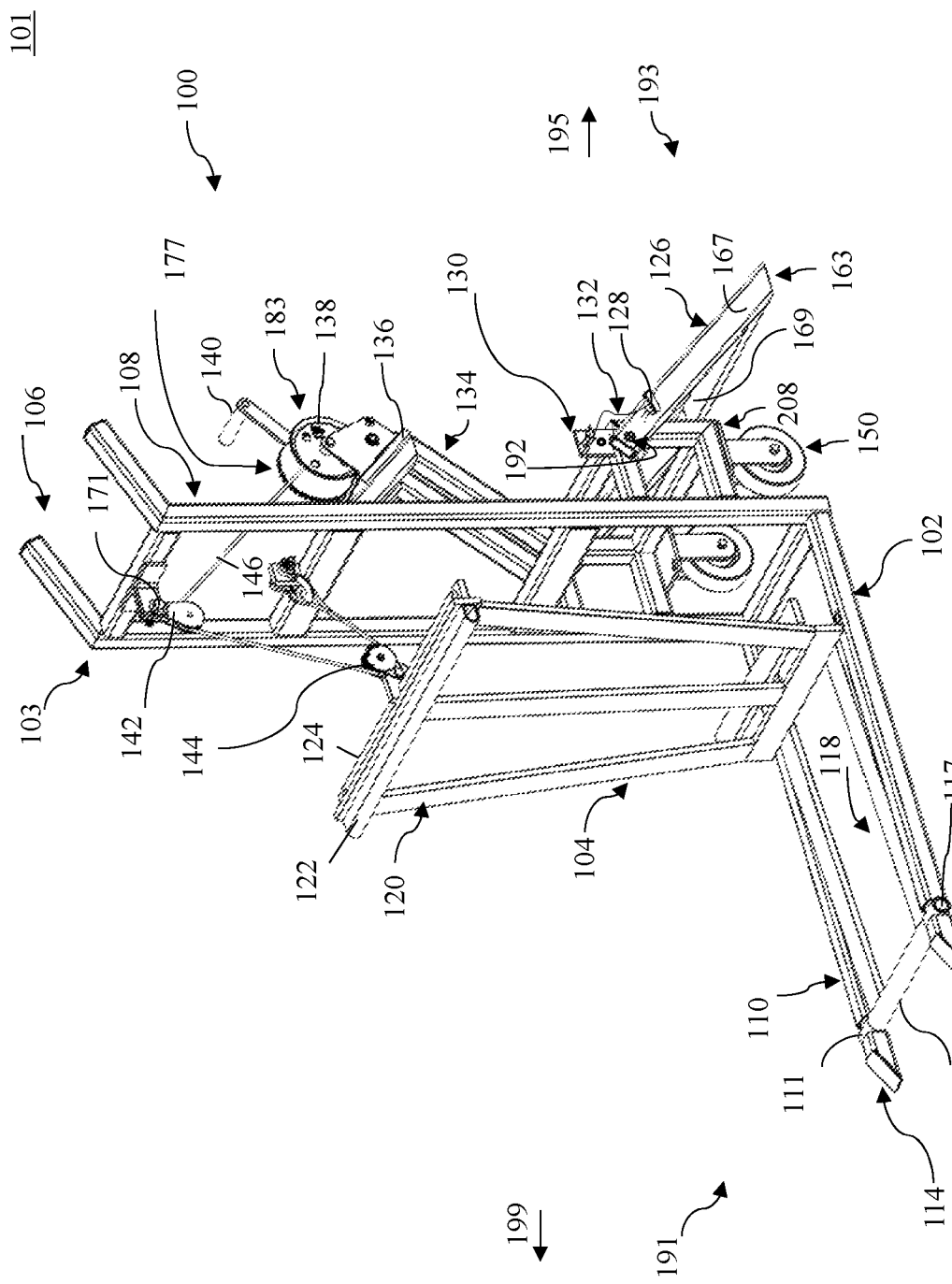
FIG. 1 illustrates a perspective view of an example wheel righting apparatus, in accordance with example embodiments of the present disclosure.

The drawings illustrate only example embodiments of the present disclosure and are therefore not to be considered limiting of its scope. The present disclosure may admit to other equally effective embodiments not illustrated specifically in the drawings.

Elements and features shown in the drawings are not necessarily to scale, emphasis instead being placed on clearly illustrating the principles of the present disclosure. Certain dimensions or positions may be exaggerated to help visually convey such principles.

DESCRIPTION OF EXAMPLE EMBODIMENTS

In the following paragraphs, various embodiments of the present disclosure will be described in detail with reference to the attached drawings. In the description, well-known components, methods, and/or processing techniques are omitted or are briefly described so as not to obscure the disclosure. While the description describes particular embodiments, this is done for illustration purposes only. A person skilled in the relevant art will recognize that other components and configurations may be used without parting from the spirit and scope of the present disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

Overview

An example wheel righting apparatus of the present disclosure includes a main frame and a wheel latching frame that are pivotally coupled such that the wheel latching frame pivots relative to the main frame. Further, the wheel righting apparatus includes a winch assembly that is coupled to the main frame. The winch assembly is operable to adjust a wheel between a horizontal position and a vertical position by pivoting the wheel latching frame relative to the main frame.

Example Embodiments

Example embodiments of the present disclosure address a need in the art for lifting a wheel from a horizontal position to an upright position. The term "horizontal position" as used herein in association to a wheel generally refers to a position of the wheel in which the wheel is laying substantially flat on a surface (e.g., the ground), with an axis of rotation of the wheel being substantially perpendicular to the surface. The term "upright position" as used herein in association to the wheel generally refers to a position of the wheel in which the wheel is standing substantially upright on a surface, with an axis of rotation of the wheel being substantially parallel to the surface. For example, the wheel may be rollable along the surface in the upright position.

In certain embodiments of the present disclosure, an apparatus can be configured to lift a wheel from the horizontal position to the upright position. This operation may be referred to as "righting" the wheel. For example, a person may use the apparatus to "right" the wheel from the horizontal position to the upright position.

As would be recognized by a person skilled in the art, wheels can have various different sizes and shapes. For example, certain wheels can be relatively light weight, and other wheels can be relatively heavy. As used herein, the term "heavy" in association with a wheel generally refers to a wheel that weighs more than 150 pounds. Heavy wheels may, but do not necessarily, have large diameters. For example, certain heavy wheels for aircraft can weigh around 500 pounds, with a diameter around 55 inches in length. In certain embodiments of the present disclosure, the apparatus can be adjustable or otherwise configured to accommodate wheels of various different sizes and shapes. For example, the apparatus may accommodate wheels of tractors, trailers, heavy moving equipment, etc.

As will be described in more detail below, in certain example embodiments, the apparatus is configured to enable a single person to right a heavy wheel, such as a heavy aircraft wheel, safely, with minimal physical exertion required by the person and with minimal risk of damaging the wheel. In certain embodiments, the apparatus also can be configured to enable the person to safely and easily transport the righted wheel from one location to another, e.g., from a trailer to a maintenance shop, from one location to another in the maintenance shop, from the maintenance shop to an aircraft, etc. In such embodiments, the apparatus may be portable and/or relatively light weight.

Example embodiments of the wheel righting apparatus will be described more fully hereinafter with reference to the accompanying drawings. If a component of a drawing is described but not expressly shown or labeled in the drawing, the label used for a corresponding component in another drawing can be inferred to that component. Conversely, if a component in a drawing is labeled but not described, the description for such component can be substantially the same as the description for a corresponding component in another drawing. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Turning now to the drawings, FIGS. 1-6 illustrate a wheel righting apparatus, in accordance with certain example embodiments. FIGS. 7-12 illustrate a wheel righting apparatus, in accordance with certain alternative example embodiments. FIGS. 13-18 illustrate an operation of the wheel righting apparatus of FIGS. 1-12, in accordance with certain example embodiments.

Referring to FIGS. 1-6, an example wheel righting apparatus 100 (hereinafter referred to as the "apparatus") may include a main frame 102 and a wheel latching frame 104. The wheel latching frame 104 may be coupled to the main frame 102 such that the wheel latching frame 104 is pivotable relative to the main frame 102. For example, the wheel latching frame 104 may be pivotable between a stowage position 101 and a latching position 1302 (shown in FIG. 13).

The main frame 102 may include a main support subframe 103, a winch mount subframe 134, and a wheel and stand subframe 208. The main support subframe 103 may include a first upright assembly 108, a base assembly 110 that extends in a first direction 199 from one end 417 (hereinafter the "bottom end", shown in FIG. 4) of the first upright assembly 108, and a handle assembly 106 that extends in a second direction 195 from an opposite end 415 (hereinafter the "top end") of the first upright assembly 108. The first direction 199 may be opposite to the second direction 195. For example, the first direction 199 may be towards a front end 191 of the apparatus 100, and the second direction 195 may be towards a rear end 193 of the apparatus 100.

Figure 3:
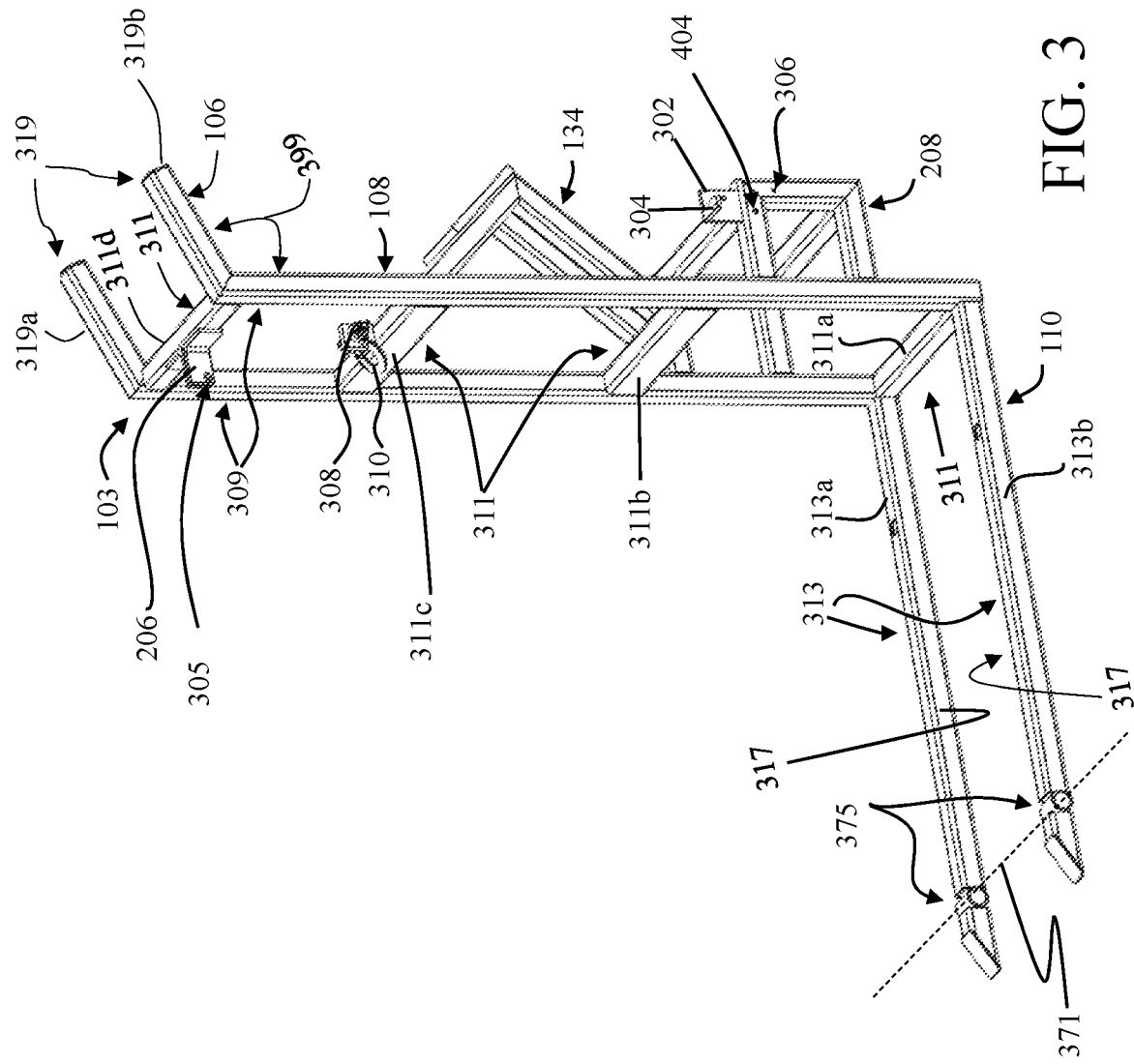
FIG. 3 illustrates a perspective view of a main frame of the wheel righting apparatus of FIG. 1, in accordance with example embodiments of the present disclosure.

As best seen in FIG. 3, the first upright assembly 108 of the main support subframe 103 may include a pair of first upright members 309 that are spaced apart from each other, and cross-bars 311 (311a-311d) that extend between the pair of upright members 309. The first upright members 309 may be, but do not necessarily have to be, substantially parallel to each other. The cross-bars 311 may be disposed at and/or in between the opposite ends (415, 417) of the first upright assembly 108. Further, the base assembly 110 of the main support subframe 103 may include a pair of longitudinal base legs 313 (the "base legs") that are spaced apart from each other. The base legs 313 may be, but do not necessarily have to be, substantially parallel to each other.

The base legs 313 may include a first base leg 313a that extends substantially perpendicularly from one of the first upright members 309 in the first direction 199, and a second base leg 313b that extends substantially perpendicularly from the other of the first upright members 309 in the first direction 199. Each base leg 313 may have a groove 405 (shown in FIG. 4) that is formed therein with a pivot tube 111 that is set in the groove 405. The pivot tubes 111 may be, but do not necessarily have to be, hollow. Each pivot tube 111 may be disposed adjacent a free end 114 of its respective base leg 313, where the free end 114 is opposite to an end of the base leg 313 that is coupled to the first upright assembly 108. The free end 114 of each base leg 313 may be beveled and covered with an end cap 112. The beveled free ends 114 and the end caps 112 may be configured to prevent or minimize damage to a wheel 1306 (shown in FIG. 13) when the base legs 313 of the apparatus 100 slide under the wheel 1306 during a righting operation, as will be described in greater detail below in association with FIGS. 13-18.

The handle assembly 106 of the main support subframe 103 may include a pair of handles 319. The pair of handles 319 may include a first handle 319a that extends in the second direction 195 from one of the first upright members 309, and a second handle 319b that extends in the second direction 195 from the other of the first upright members 309. In one example embodiment, as illustrated in FIG. 3, each of the first and second handles 319 may extend from a respective first upright member 309 at an obtuse angle 399 relative to the respective first upright member 309. However, in other example embodiments, the first and second handles (319a, 319b) may extend from the first upright members 309 at any other appropriate angle (e.g., acute, reflex, perpendicular, etc.) relative to the first upright members 309 without departing from a broader scope of the present disclosure.

Figure 2:
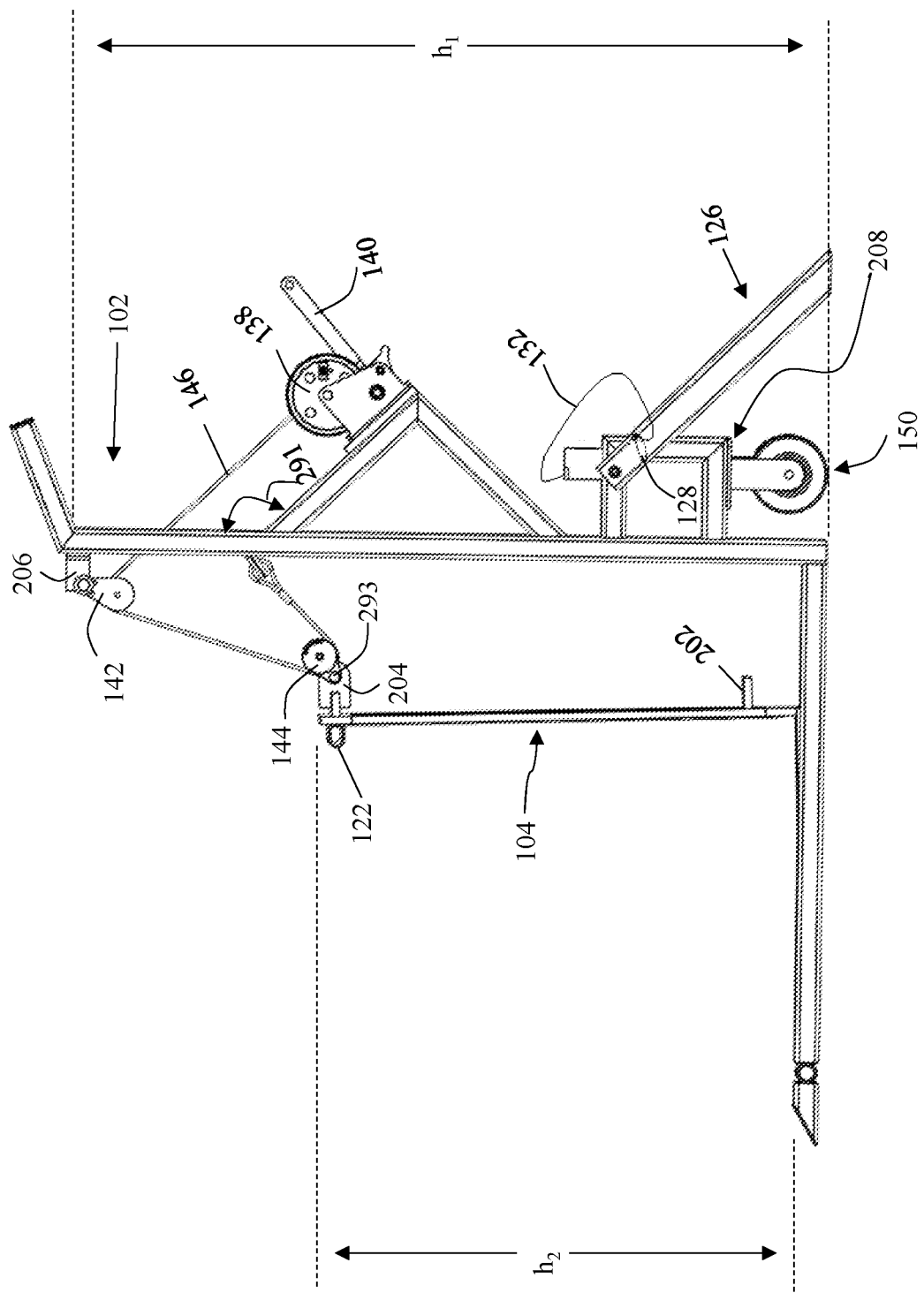
FIG. 2 illustrates a side view of the example wheel righting apparatus of FIG. 1, in accordance with example embodiments of the present disclosure.

As best illustrated in FIGS. 2 and 3, the main frame 102 also may include a first pulley mounting bracket 206 that is configured to couple a first pulley 142 thereto. The first pulley mounting bracket 206 may be coupled, for example, to the cross-bar 311*d* that is disposed at an end of the first upright assembly 108 that is opposite to the base assembly 110 (e.g., top end 415). The first pulley mounting bracket 206 may include a pulley coupling aperture 305 that is configured to receive a fastener 171 therethrough to couple the first pulley 142 to the main frame 102 as illustrated in FIGS. 1-2. Additionally, the main frame 102 may include a shackle mounting plate 308 with a shackle 310 that is coupled thereto. The shackle mounting plate 308 and the shackle 310 may be coupled, for example, to a cross-bar 311*c* of the first upright assembly 108 that is disposed below the cross-bar 311*d* at the top end 415 of the first upright assembly 108.

Figure 4:
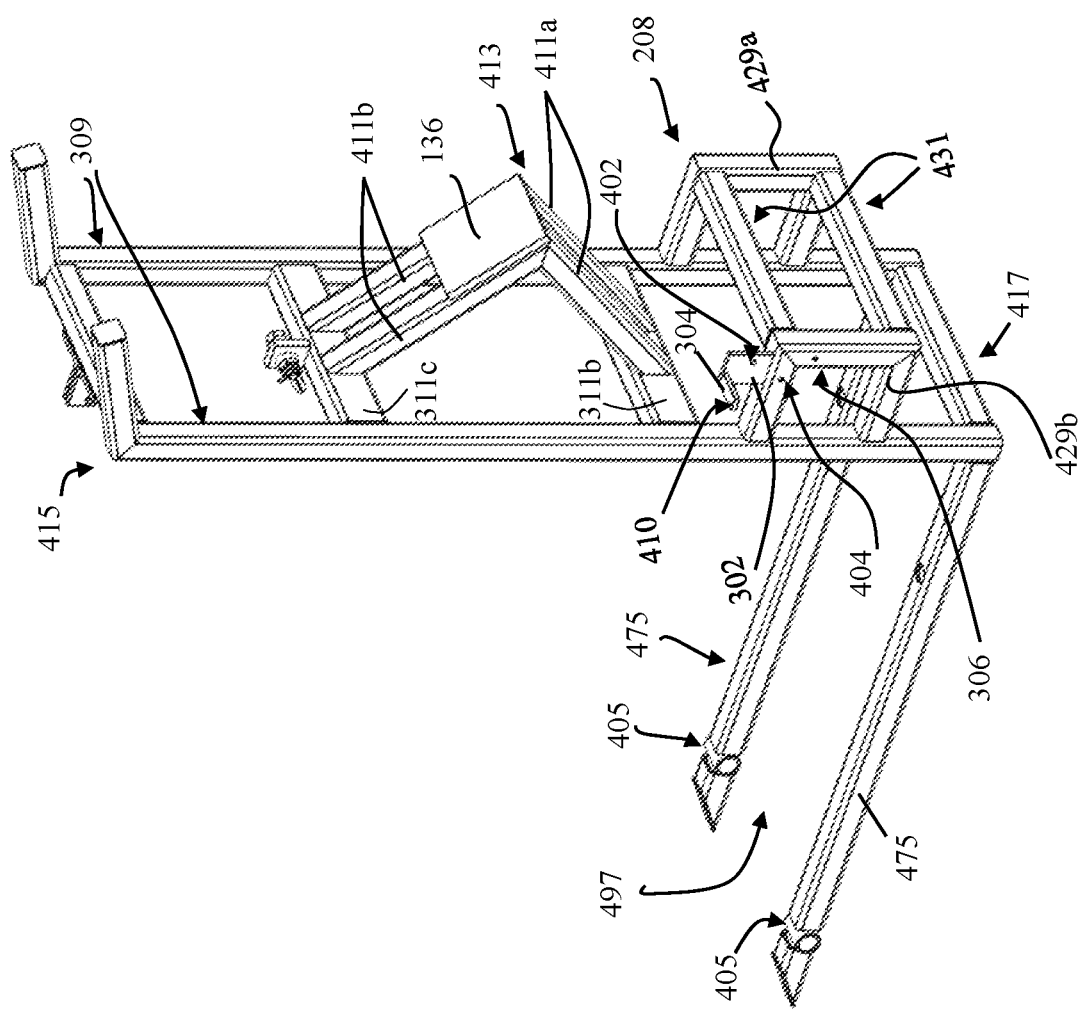
FIG. 4 illustrates another perspective view of the main frame of the wheel righting apparatus of FIG. 1, in accordance with example embodiments of the present disclosure.
Figure 5:
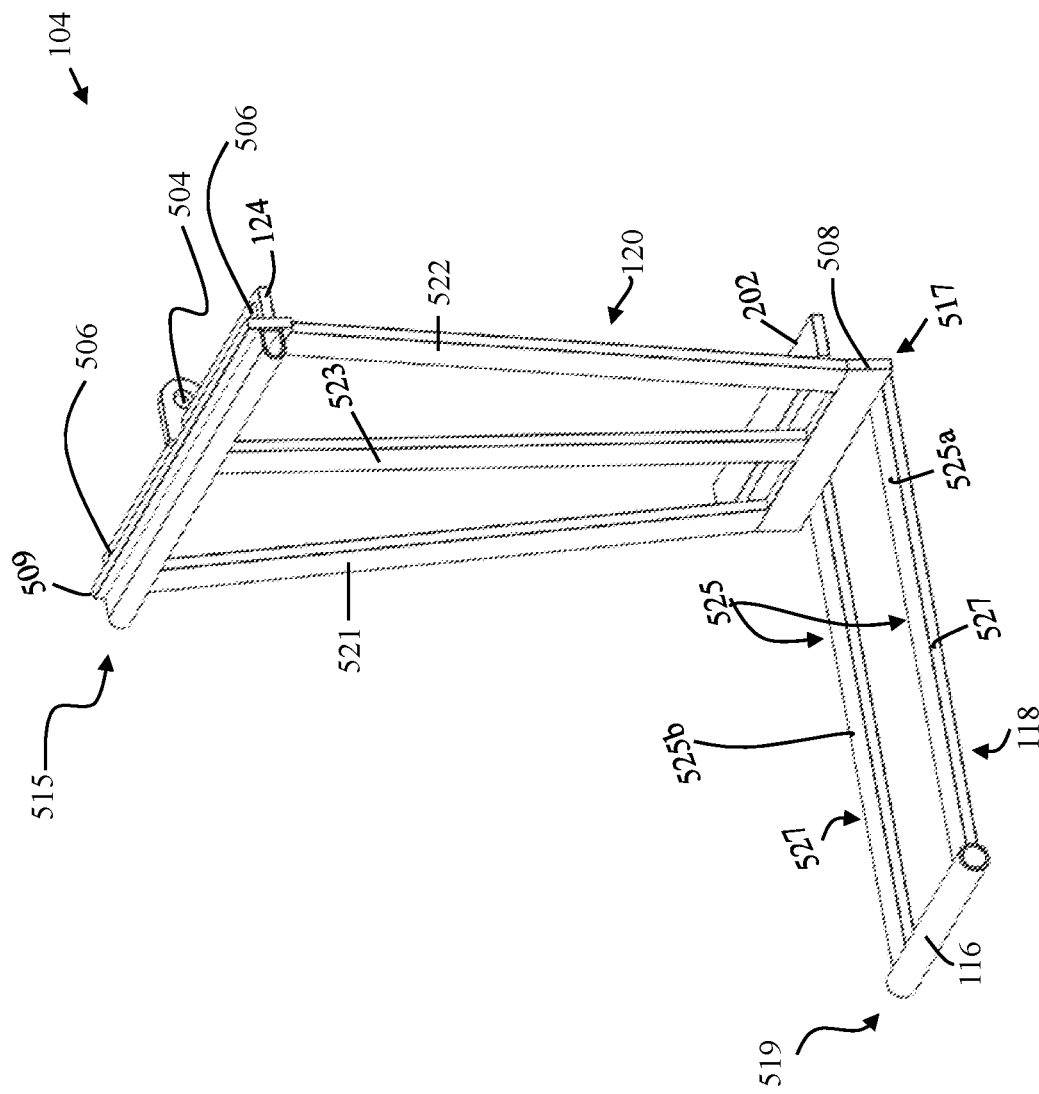
FIG. 5 illustrates a perspective view of a wheel latching frame of the wheel righting apparatus of FIG. 1, in accordance with example embodiments of the present disclosure.
Figure 6:
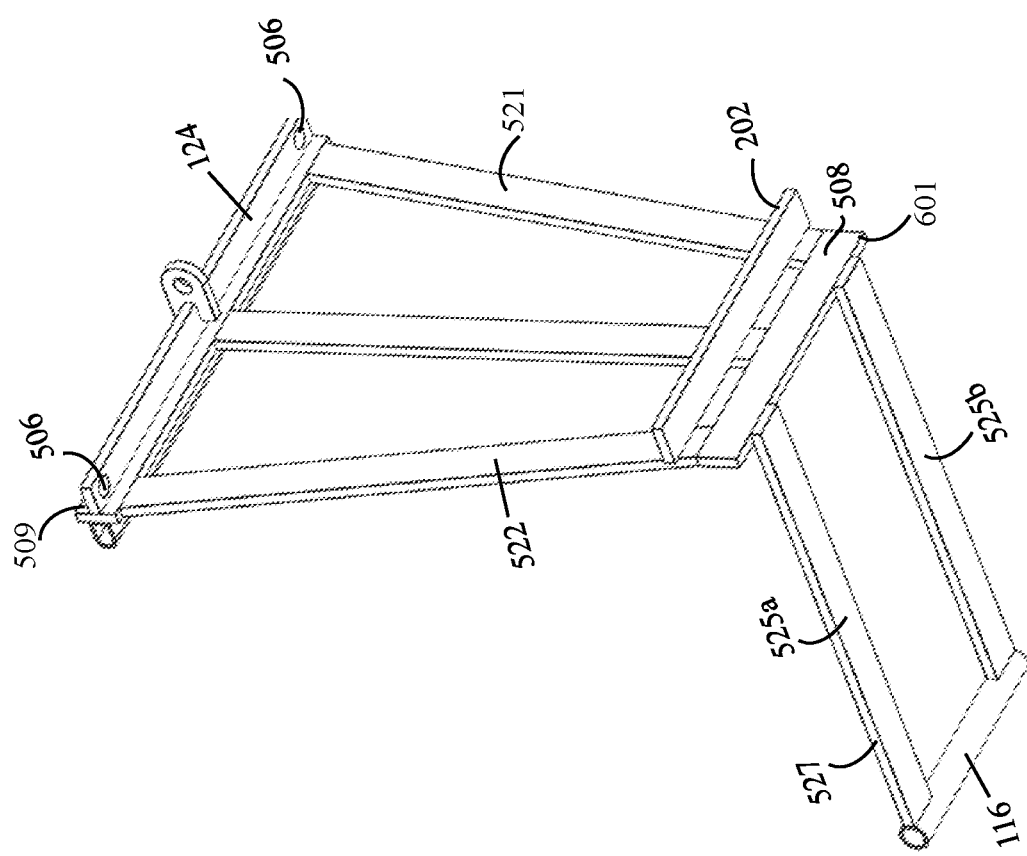
FIG. 6 illustrates another perspective view of a wheel latching frame of the wheel righting apparatus of FIG. 1, in accordance with example embodiments of the present disclosure.

As best illustrated in FIG. 4, the winch mount subframe 134 of the main frame 102 may include a first pair of arm members 411*a* and a second pair of arm members 411*b* that extend out and towards each other from the cross-bars 311*b* and 311*c* of the first upright assembly 108 that are disposed between the top and bottom ends (415, 417) thereof. The first and second pair of arm members (411*a*, 411*b*) may extend in the second direction 195 such that they meet at an apex 413. That is, the winch mount subframe 134 may be substantially triangular. A winch mounting bracket 136 may be disposed on the winch mount subframe 134 such that the winch mounting bracket 136 and a winch 138 that is disposed thereon define an obtuse angle 291 (shown in FIG. 2) with the first upright assembly 108.

As illustrated in FIG. 4, the wheel and stand subframe 208 of the main frame 102 may include a first substantially U-shaped member 429*a* that is coupled to one of the first upright members 309, a second substantially U-shaped member 429*b* that is coupled to another of the first upright members 309, and support bars 431 that are disposed between the first and second substantially U-shaped members (429*a*, 429*b*). The wheel and stand subframe 208 may extend out from the first upright assembly 108 in the second direction 195 such that swivel casters 150 and a foot rest member 126 coupled thereto are disposed at a rear end 193 of the apparatus 100. As will be described in more detail below with reference to FIGS. 13-15, in certain example embodiments, the swivel casters 150 and foot rest member 126 do not interfere with a wheel righting operation by the apparatus 100.

Each swivel caster 150 may be coupled to a respective substantially U-shaped member 429 such that the swivel caster 150 extends below the wheel and stand subframe 208. In particular, the wheel and stand subframe 208 may be offset from the bottom end 417 of the first upright assembly 108 such that the swivel casters 150 have a same vertical profile as the first upright members 309 of the first upright assembly 108. That is, the apparatus 100 rests on the swivel casters 150 at the rear end 193, and the apparatus 100 rests on the base legs 313 of the main support subframe 103 at the front end 191.

Figure 12:
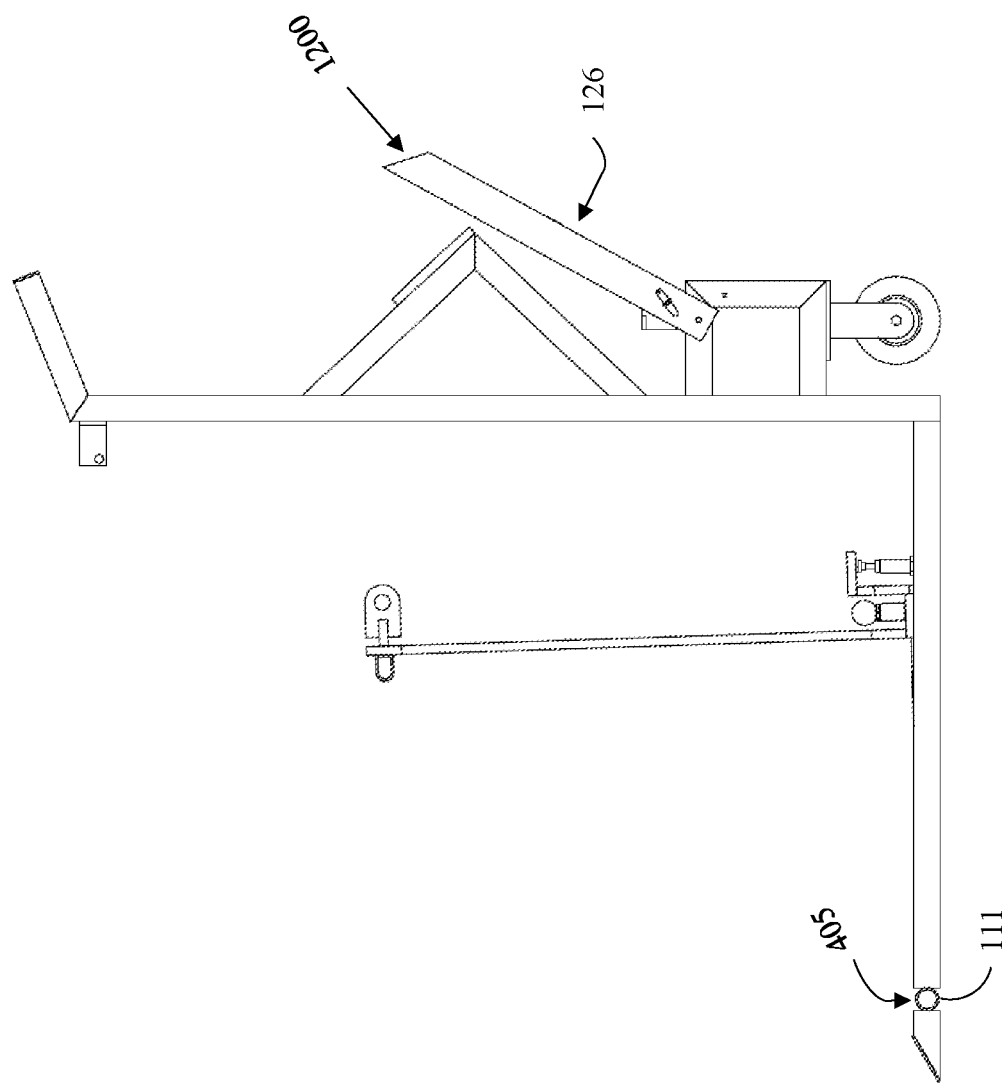
FIG. 12 illustrates a side view of the wheel righting apparatus of FIG. 7 without a winch assembly and with the foot rest member in a transport position, in accordance with example embodiments of the present disclosure.

Each of the substantially U-shaped members (429*a*, 429*b*) may include a coupling hole 404. Further, at least one of the substantially U-shaped members (429*a*, 429*b*) may include a first locking hole 306 that is formed therein. The coupling holes 404 of the substantially U-shaped members (429*a*, 429*b*) may be configured to receive fasteners 192 therethrough to pivotally couple the foot rest member 126 to the wheel and stand subframe 208. For example, the foot rest member 126 may be pivoted between a transport position 1200 as illustrated in FIG. 12 and a lifting position 163 as illustrated in FIG. 1. In the lifting position 163, the foot rest member 126 is pointed downward towards the bottom end 417 of the first upright assembly 108. In the transport position 1200, the foot rest member 126 is pointed upward towards the top end 415 of the first upright assembly 108.

The first locking hole 306 of the substantially U-shaped member 429*b* may be configured to receive a locking pin 128 therein to lock the foot rest member 126 in the lifting position 163. The foot rest member 126 may include, for example, two arms 167 that pivotally couple to the wheel and stand subframe 208, and a foot rest plate 169 that extends between the two arms 167 at one end thereof. In certain example embodiments, the foot rest plate 169 may provide a platform for an operator to stand on and use the operator's body weight as a counterweight to a weight of a wheel that is being lifted to an upright position during a wheel righting operation.

The wheel and stand subframe 208 may include a foot rest stop assembly 130 (shown in FIG. 1) that is configured to stop the foot rest member 126 from being pivoted upwards beyond the foot rest stop assembly 130, e.g., when the foot rest member 126 is being pivoted from the lifting position 163 to the transport position 1200. The foot rest stop assembly 130 may include a foot rest stop plate 302 (shown in FIG. 3) that extends upwards towards the handle assembly 106 from a top surface of one of the substantially U-shaped members 429*b*, and a stop tab 304 that extends substantially perpendicular to the foot rest stop plate 302.

The foot rest stop plate 302 may include a second locking hole 402 that is configured to receive the locking pin 128 therein to lock the foot rest member 126 in the transport position 1200. In certain example embodiments, the foot rest member 126 may include a corresponding locking hole that will be axially aligned with one of the locking holes (402, 306) of the wheel and stand subframe 208 to receive the locking pin 128 therethrough for locking the foot rest member 126 in a desired position (163 or 1200). The stop tab 304 of the foot rest stop assembly 130 may include a securement hole 410 (shown in FIG. 4) that is configured to receive a lanyard 132 therethrough to securely couple the locking pin 128 to the stop tab 304. In other example embodiments, the locking pin 128 may be secured to the main frame 102 using any other appropriate mechanisms without departing from a broader scope of the present disclosure.

In certain example embodiments, the wheel latching frame 104 is pivotally coupled to the main frame 102. The wheel latching frame 104 may include, for example, second upright assembly 120, a load support assembly 118 that extends substantially perpendicular to the second upright assembly 120 toward the first direction 199 from a bottom end 517 (shown in FIG. 5) of the second upright assembly 120, and a coupling tube 116 that is disposed at an end 519 of the load support assembly 118.

The second upright assembly 120 may include a top plate 509 and a bottom plate 508, where the top plate 509 is longer that the bottom plate 508. Further, the second upright assembly 120 may include a third upright member 521, a fourth upright member 522, and a fifth upright member 523 that extend between the bottom plate 508 and the top plate 509. The third and fourth upright members 521 and 522 are spaced apart from each other and arranged such that a width of the second upright assembly 120 (measured as a distance between the third and fourth upright members 521 and 522) tapers from the top plate 509 to the bottom plate 508. The tapering frame of the second upright assembly 120 may provide a better grip on the wheel 1306, e.g., when the wheel 1306 is coupled to the wheel latching frame 104, as compared to a non-tapering frame (not illustrated), for example.

The load support assembly 118 may include a pair of longitudinal support legs 525 that extend substantially perpendicular to the second upright assembly 120 from a bottom end 517 of the bottom plate 508. The pair of longitudinal support legs 525 are spaced apart from each other and extend in the first direction 199. In one or more example embodiments, a distance between the outer edges 527 of the pair of longitudinal support legs 525 may be shorter than a distance between inner edges 317 of the base legs 313 of the main support subframe 103. As such, the load support assembly 118 may fit in a space 497 (shown in FIG. 4) between the base legs 313 of the base assembly 110 of the main frame 102.

The coupling tube 116 of the wheel latching frame 104 may include a tube that is disposed at the end 519 of the load support assembly 118 that is away from the second upright assembly 120. The coupling tube 116 may be, but does not necessarily have to be, hollow in certain exemplary embodiments. The coupling tube 116 may extend across the pair of longitudinal support legs 525 such that one longitudinal support leg 525a is coupled to one end of the coupling tube 116 and the other longitudinal support leg 525b is coupled to the other end of the coupling tube 116.

The wheel latching frame 104 may include a shoulder plate 202 that is disposed adjacent to and offset from the bottom end 517 of the second upright assembly 120. The shoulder plate 202 may be substantially perpendicular to the second upright assembly 120 and extend in the second direction 195. The wheel latching frame 104 may further include a latching plate 124 and a guard member 122 that extend substantially perpendicular to the second upright assembly 120 from the top plate 509 thereof. In particular, the latching plate 124 extends in the second direction 195, and the guard member 122 extends in the first direction 199. The latching plate 124 may include latching apertures 506 that are configured to couple a tie-down strap 1303 (shown in FIG. 13) to the latching plate 124. In certain example embodiments, the guard member 122 may include an elongate rubber gasket that is flexible. In other example embodiments, the guard member 122 may be formed using any other appropriate flexible material. For example, the guard member 122 may include a hollow rubber gasket that adjusts to a contour of a wheel (e.g., wheel 1306 in FIG. 14) when the second upright assembly 120 and the guard member 122 engage the wheel 1306 in the latching position 1302. The guard member 122 may be configured to prevent damage to the wheel 1306 by the apparatus 100 during a righting operation.

The wheel latching frame 104 may also include a second pulley mounting bracket 204 that extends from the second upright assembly 120 in the second direction 195. The second pulley mounting bracket 204 may include a coupling aperture 504 formed therein, where the coupling aperture 504 is configured to receive a fastener 293 (shown in FIG. 2) therein to couple a second pulley 144 to the wheel latching frame 104.

As illustrated in FIG. 1, the wheel latching frame 104 may be arranged with respect to the main frame 102 such that the coupling tube 116 of the wheel latching frame 104 is disposed in between the pivot tubes 111 of the pair of base legs 313 of the main frame 102, with the coupling tube 116 and the pivot tubes 111 being axially aligned. Further, a pivot rod 117 may be disposed in the coupling tube 116 and the pivot tubes 111. For example, the pivot rod 117 may extend through the axially aligned coupling tube 116 and the pivot tubes 111 to pivotally couple the wheel latching frame 104 to the main frame 102. The pivot rod 117 may be longer than the coupling tube 116 such that the pivot rod 117 extends into the pivot tubes 111 of the main frame 102 at both ends thereof. The wheel latching frame 104 may be configured to pivot, via the coupling tube 116, relative to a horizontal axis 371 that passes through coupling points 375 where the wheel latching frame 104 couples to the main frame 102. Alternatively, the horizontal axis 371 may be defined as an axis that passes through center points of the axially aligned coupling tube 116 and the pivot tubes 111. One skilled in the art will recognize that, in other example embodiments, the wheel latching frame 104 may be pivotally coupled to the main frame using any other appropriate coupling mechanism without departing from a broader scope of the present disclosure.

In certain example embodiments, the apparatus 100 may include a winch assembly 183 (shown in FIG. 1) that is coupled to both the main frame 102 and the wheel latching frame 104. The winch assembly 183 may be configured to pivot the wheel latching frame 104 between the stowage position 101 and the latching position 1302 using a winch 138 of the winch assembly 183. The winch assembly 183 may include the winch 138, the first pulley 142, the second pulley 144, and a wire rope 146, for example.

In one example, the winch 138 may include a single-speed manual geared hand winch. However, in other examples, any other device that is functionally similar to the winch may be used without departing from a broader scope of the present disclosure. The winch 138 may include, for example, a spool 177 on which the wire rope 146 is wound, and a hand crank 140 that is coupled to the spool 177. The winch 138 may be mounted on the winch mounting bracket 136 that is disposed on the winch mount subframe 134.

The first pulley 142 may be coupled to the main frame 102 via the first pulley mounting bracket 206 of the main frame 102. The second pulley 144 may be coupled to the wheel latching frame 104 via the second pulley mounting bracket 204 of the wheel latching frame 104. In particular, the first pulley 142 may be coupled to the cross-bar 311d disposed at the top end 415 of the first upright assembly 108 such that it extends out from the first upright assembly 108 in the first direction 199, and the second pulley 144 may be coupled to the top plate 509 disposed at the top end 515 of the second upright assembly 120 such that it extends out from the second upright assembly 120 in the second direction 195. That is, the first and second pulleys (142, 144) may be disposed facing each other.

In certain example embodiments, as illustrated in FIG. 2, a height h2 of the second upright assembly 120 of the wheel latching frame 104 may be less than a height h1 of the first upright assembly 108 of the main frame 102. As such, the second pulley 144 that is coupled to the second upright assembly 120 may be disposed below the first pulley 142 that is coupled to the first upright assembly 108. In one example, the first pulley 142 may include a fixed single pulley and the second pulley 144 may include a snatch block pulley. However, in other examples, the first and second pulleys 142 and 144, respectively, may include any other appropriate pulley or block combination that can comfortably handle the weight of a wheel during a wheel righting operation without departing from a broader scope of the present disclosure.

As illustrated in FIGS. 1-2, in certain example embodiments, one end of the wire rope 146 may be secured to the winch 138 (e.g., on a frame of the winch 138), with the wire rope 146 being wound on to the spool 177 of the winch 138, extended through the first pulley 142 that is coupled to the main frame 102 and the second pulley 144 that is coupled to the wheel latching frame 104, and secured to the shackle 310 of the main frame 102 at an opposite end of the wire rope 146. That is, the wire rope 146 that is secured to the winch 138 at one end, goes through the two pulleys (142, 144), and is secured to the main frame 102 at an opposite end thereof. Though referred to herein as a "rope", a person having ordinary skill in the relevant art will recognize that the wire rope 146 may include a rope, cable, or other material capable of being wound around a spool and extended through pulleys 142 and 144. During a wheel righting operation, the hand crank 140 of the winch 138 may be rotated (clockwise or anticlockwise) to let out or pull in the wire rope 146 to pivot the wheel latching frame 104 relative to the main frame 102.

Though FIGS. 1-6 illustrate an example apparatus 100 with a wheel latching frame 104 that has a second upright assembly 120 that is fixedly attached to the pair of longitudinal support legs 525, one of skill in the relevant art will recognize that the second upright assembly 120 may be adjustably coupled to the pair of longitudinal support legs 525 in other example embodiments without departing from a broader scope of the present disclosure. One such example apparatus 700 that includes an adjustable wheel latching frame 740 is illustrated in FIGS. 7-11. In the example apparatus 700, the wheel latching frame 740 may include a second upright assembly 120a that is adjustably coupled to the pair of longitudinal support legs 725. Adjustably coupling the second upright assembly 120a to the pair of longitudinal support legs 725 can allow the apparatus 700 to accommodate wheels of different shapes and sizes, for example.

The apparatus 700 that is illustrated in FIGS. 7-11 may be substantially similar to the apparatus 100 of FIGS. 1-6 except for additions such as shock absorbers 702 and the adjustable second upright assembly 120a. As such, the description of the components of the apparatus 700 that are substantially similar to the apparatus 100 of FIGS. 1-6 will be not repeated herein for the sake of brevity. That is, only those components of the apparatus 700 that are different from or additional to that of the apparatus 100 will be described in the following paragraphs.

Figure 7:
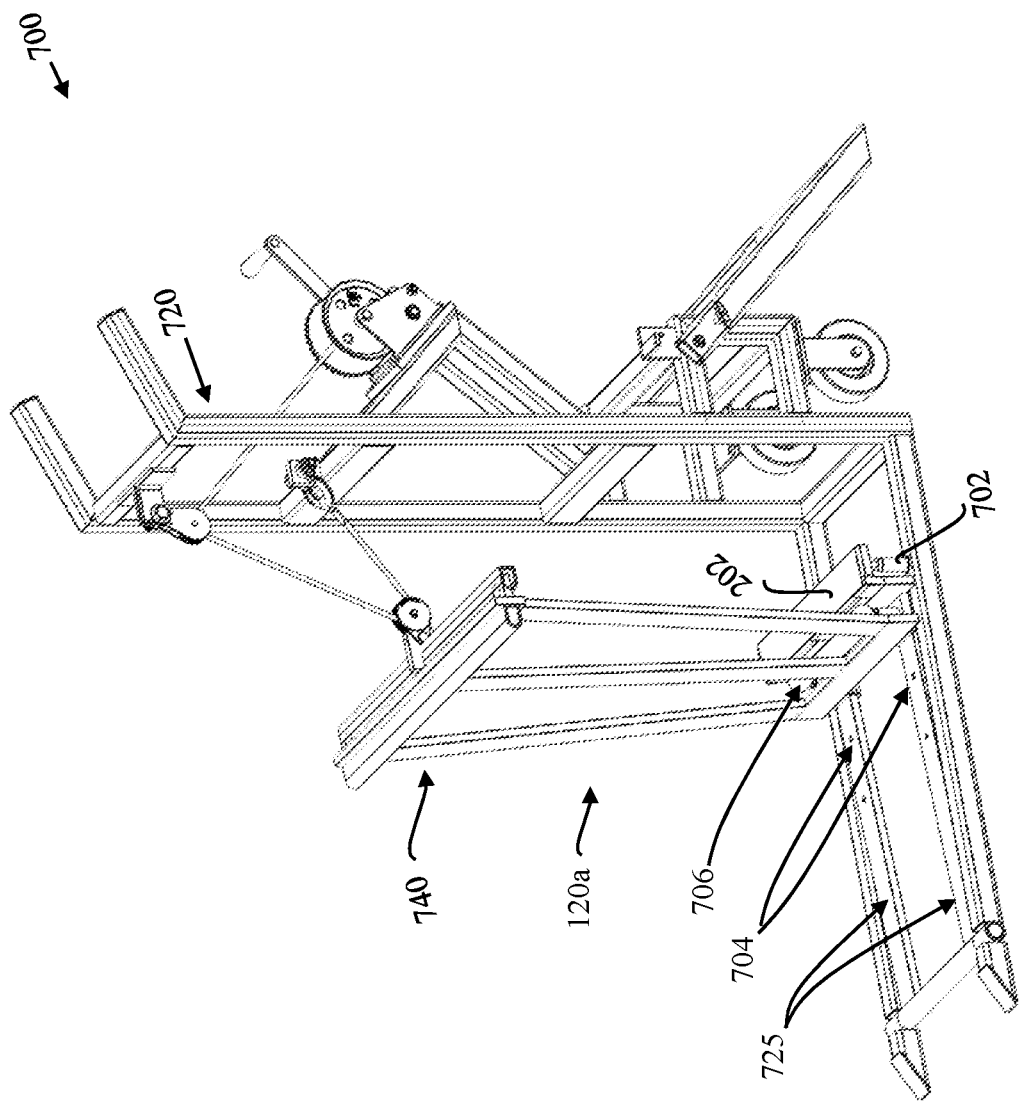
FIG. 7 illustrates a perspective view of another example wheel righting apparatus, in accordance with example embodiments of the present disclosure.
Figure 8:
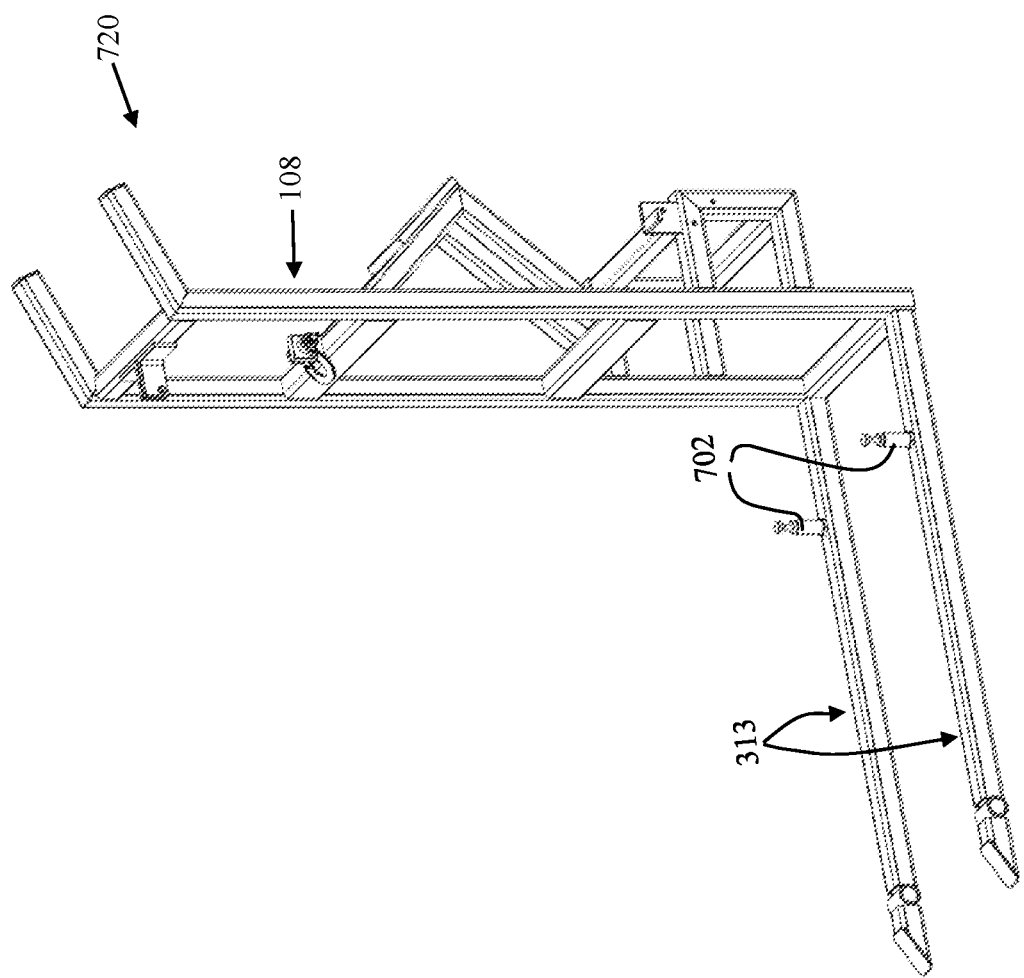
FIG. 8 illustrates a perspective view of an example main frame of the wheel righting apparatus of FIG. 7, in accordance with example embodiments of the present disclosure.
Figure 9:
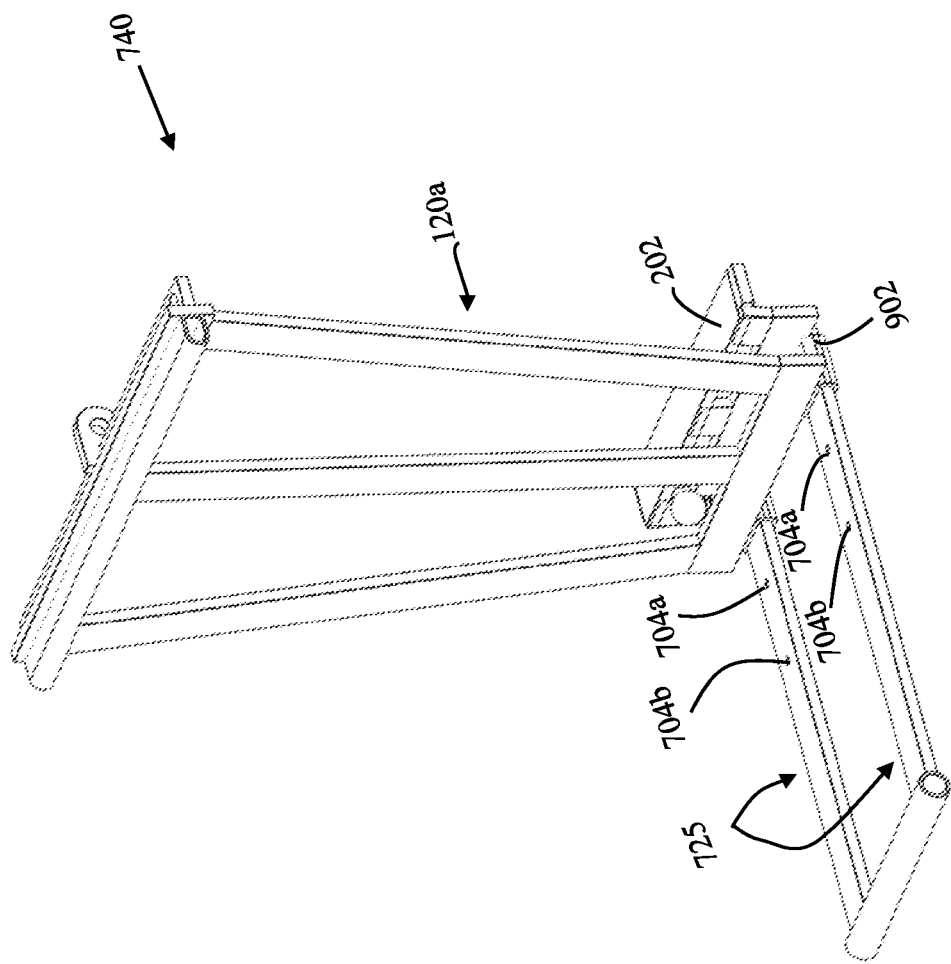
FIG. 9 illustrates a perspective view of an example wheel latching frame of the wheel righting apparatus of FIG. 7, in accordance with example embodiments of the present disclosure.
Figure 10:
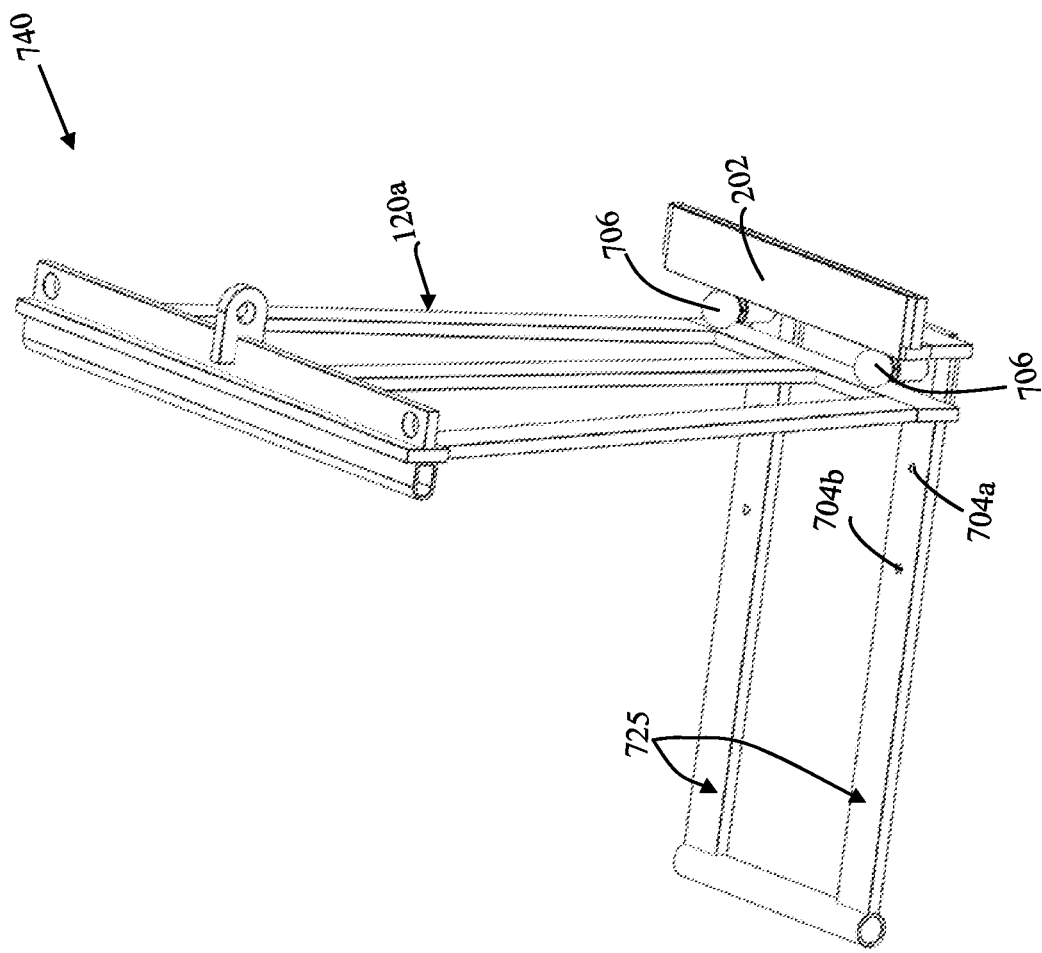
FIG. 10 illustrates another perspective view of the wheel latching frame of the wheel righting apparatus of FIG. 7, in accordance with example embodiments of the present disclosure.
Figure 11:
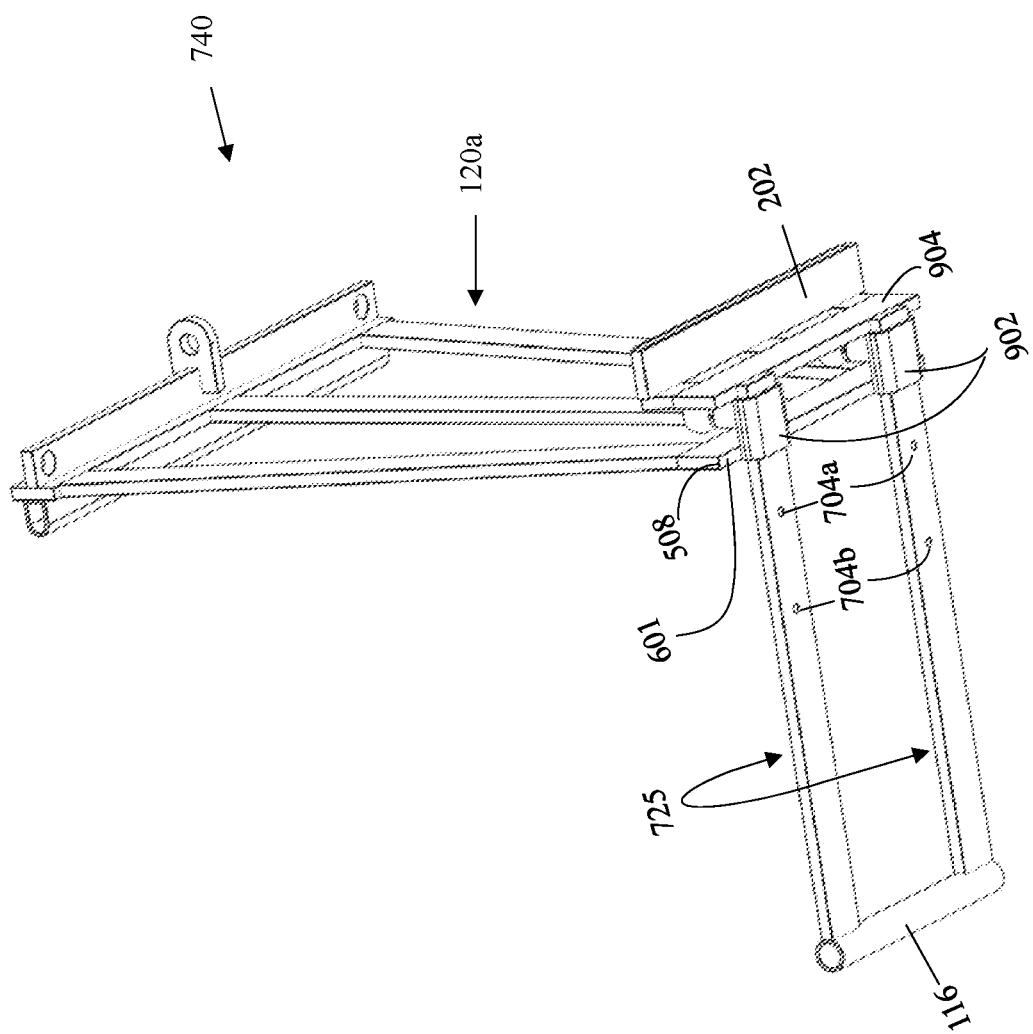
FIG. 11 illustrates yet another perspective view of the wheel latching frame of the wheel righting apparatus of FIG. 7, in accordance with example embodiments of the present disclosure.

Referring to FIGS. 7-11, the main frame 720 may include shock absorbers 702 that are disposed in the pair of base legs 313. The shock absorbers 702 may be disposed adjacent to the first upright assembly 108 and positioned such that the shoulder plate 202 (e.g., a bottom surface of the shoulder plate 202) of the wheel latching frame 740 engages the shock absorbers 702 when the wheel latching frame 740 is in the stowage position 101 as shown in FIG. 7. The shock absorbers 702 may be configured to absorb any impulses or vibrations (e.g., shock impulses) that are generated when the bottom plate 508 of the wheel latching frame 740 lands on the pair of base legs 313, e.g., when the wheel latching frame 740 is pivoted back to the stowage position 101 (with or without the wheel 1306 strapped thereto) from the latching position 1302.

In certain example embodiments, the wheel latching frame 740 of the apparatus 700 may include a pair of loop brackets 902 (shown in FIG. 9) that are coupled to the bottom plate 508 of the second upright assembly 120a. Each loop bracket 902 defines an eye that is configured to receive a respective longitudinal support leg 725 of the wheel latching frame 740 therethrough such that the second upright assembly 120a can be adjusted along the pair of longitudinal support legs 725 in the first direction 199 or the second direction 195. Each of the longitudinal support legs 725 may include multiple adjustment apertures 704 that are formed therein; and each loop bracket 902 may have a fastening member that is coupled thereto. The fastening members may include adjustment pins 706 that are configured to extend through the adjustment apertures 704 on the longitudinal support legs 725 to lock the second upright assembly 120a at a desired position on the pair of longitudinal support legs 725. To adjust the second upright assembly 120a, the operator 1490 may remove or disengage the adjustment pins 706 from a first pair of the adjustment apertures 704a on the longitudinal support legs 725. Then, the operator 1490 may slide the second upright assembly 120a along the pair of longitudinal support leg 725 to the next pair of the adjustment apertures 704b on the longitudinal support legs 725 and insert the adjustment pins 706 through the next pair of the adjustment apertures 704b to lock the second upright assembly 120a in the new position. The second upright assembly 120a may be adjusted, for example, based on the size of the wheel 1306 that is to be lifted to the upright position.

Additionally, the wheel latching frame 740 may include a base plate 904 that disposed at an end of the pair of longitudinal support legs 725 that is opposite to the coupling tube 116. The base plate 904 may be substantially perpendicular to the pair of longitudinal support legs 725. The shoulder plate 202 may extend out in the second direction 195 from an end of the base plate 904 that is away from the longitudinal support legs 725 such that the shoulder plate 202 is substantially perpendicular to the base plate 904.

The wheel righting operation of the apparatus 700 will now be described with reference to FIGS. 13-15. In certain example embodiments, an operator 1490 may transport the apparatus 700 to a location of a wheel 1306 that is to be righted from a horizontal position to an upright position. The apparatus 700 may be transported from one location to another, for example, by rolling the apparatus 700 using the swivel casters 150. For example, the operator 1490 may grip the handles 319 and tip the apparatus 700 in the second direction 195, i.e., towards the rear end 193 such that only the swivel casters 150 of the apparatus 700 engage the floor. Then, the operator 1490 may push, i.e., roll the apparatus 700 in the first direction 199 to transport the apparatus 700 to a desired location.

During transportation, the foot rest member 126 may be locked in the transport position 1200 (shown in FIG. 12). During transportation or when stored (or in default state), the wheel latching frame 740 may be maintained in the stowage position 101 (shown in FIGS. 7 and 12). For example, the winch assembly 183 may maintain the wheel latching frame 740 in the stowage position 101. In the stowage position 101, the wheel latching frame 740 is disposed adjacent the main frame 102 such that: (a) the pair of longitudinal support legs 725 are substantially parallel to and disposed in a space 497 between the pair of base legs 313 of the main frame 102; (b) a bottom edge 601 (shown in FIGS. 6 and 11) of the bottom plate 508 of the second upright assembly 120a rests on the pair of base legs 313 of the main frame 102; and (c) the second upright assembly 120a is substantially parallel to the first upright assembly 108 of the main frame 102.

Figure 13:
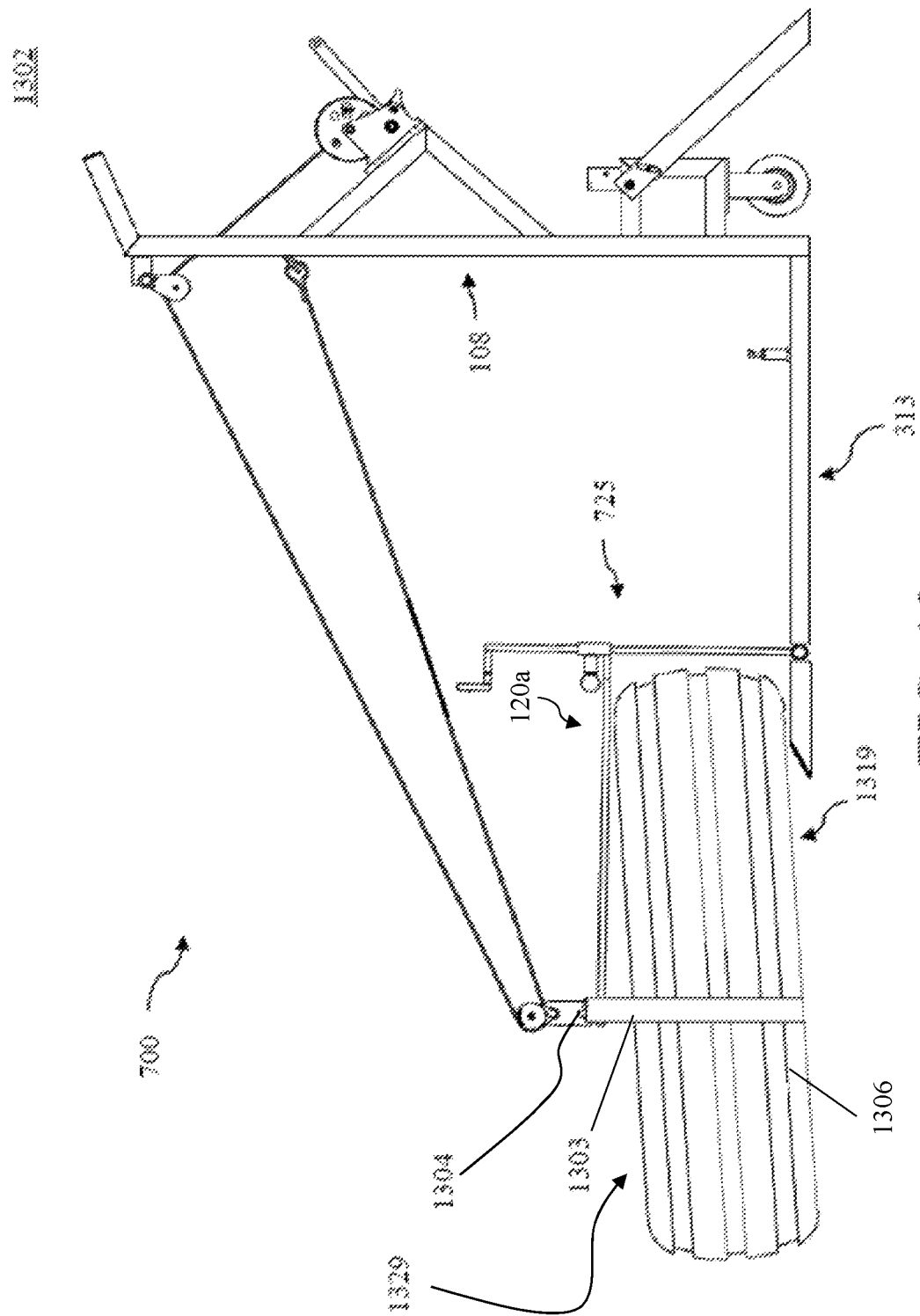
FIGS. 13-15 illustrate a righting operation of the wheel righting apparatus to lift a wheel from a horizontal position to an upright position, in accordance with example embodiments of the present disclosure.
Figure 14:
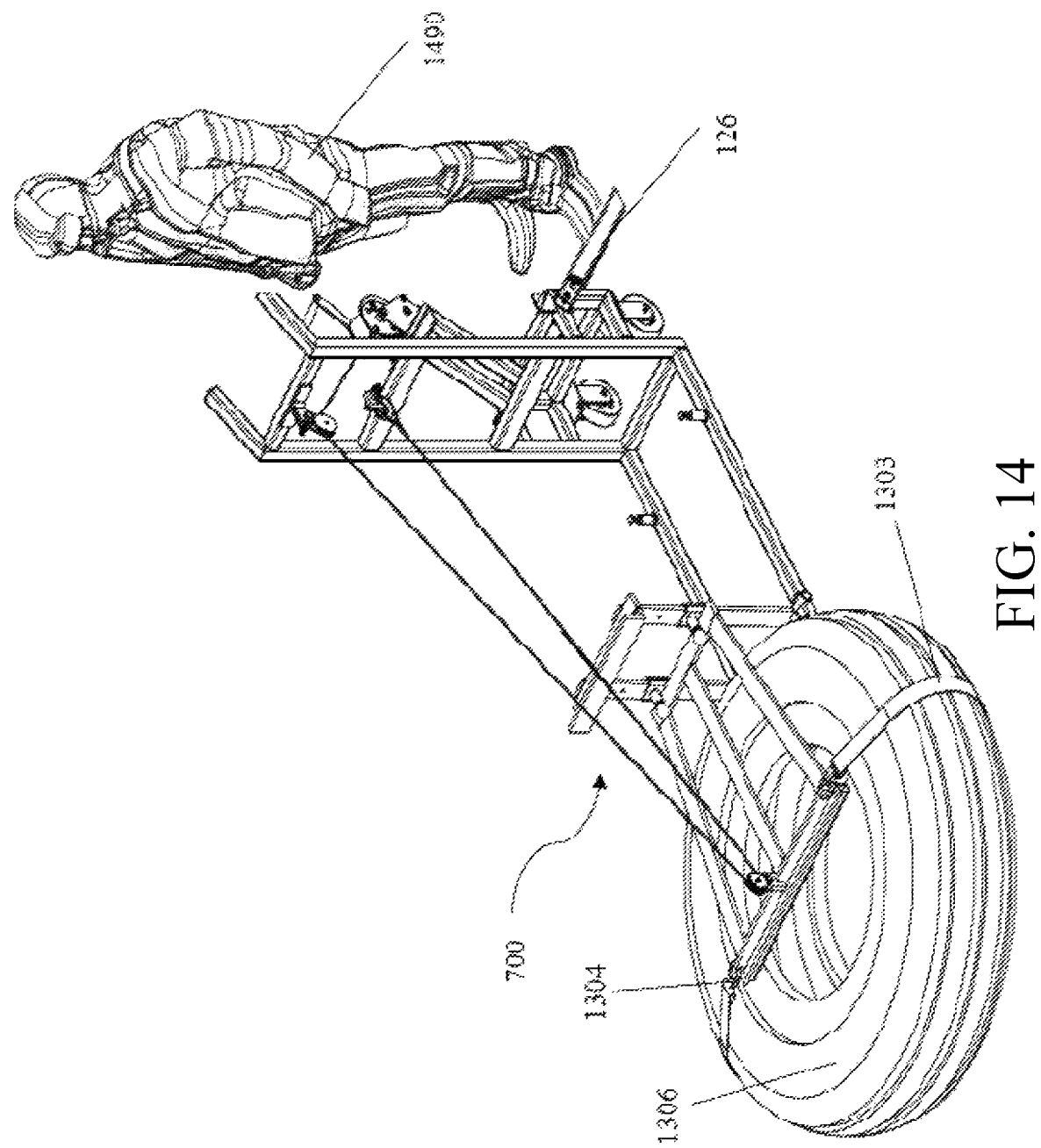

As illustrated in FIG. 13, once the apparatus 700 is transported to the desired location, e.g., adjacent the wheel 1306 that is to be righted, the operator 1490 may adjust the apparatus 700 such that at least a portion of the pair of base legs 313 of the main frame 720 slides under the wheel 1306 that is in the horizontal position, e.g., in between the surface on which the wheel 1306 is disposed and a bottom surface 1319 of the wheel 1306 (e.g., a surface of the wheel that faces a ground surface). The wheel 1306 that is in the horizontal position may first engage the free ends 114 of the pair of base legs 313 (which may be beveled) and then slide, at least in part, onto the pair of base legs 313. For example, the operator 1490 may apply pressure on the apparatus 700 towards the first direction 199 to slide the free ends 114 and base legs 313 under the wheel 1306. The operator 1490 may rotate the hand crank 140 of the winch 138 to let out the wire rope 146, which in turn may pivot the wheel latching frame 740 from the stowage position 101 to the latching position 1302, as illustrated in FIG. 13.

In the latching position 1302, the wheel latching frame 740 extends away from the main frame 720 such that the wheel latching frame 740 defines a cantilever structure where the wheel latching frame 740 extends beyond the front end 191 of the main frame 720 in the first direction 199. In particular, in the latching position 1302 where the wheel latching frame 740 engages the wheel 1306 that is in the horizontal position, the pair of longitudinal support legs 725 have been pivoted relative to the main frame 720 so that they are disposed substantially parallel to the first upright assembly 108 of the main frame 720. Similarly, in the latching position 1302, the second upright assembly 120a has been pivoted relative to the main frame 720 so that it is disposed substantially parallel to the pair of base legs 313 of the main frame 720. One of skill in the art will recognize that, in certain example embodiments, in the absence of a wheel 1306, the wheel latching frame 740 may be pivoted all the way out till at least a portion of the second upright assembly 120a (e.g., the top plate 509 or the guard member 122) of the wheel latching frame 740 engages the floor or surface on which the wheel righting apparatus 700 is disposed.

As illustrated in FIG. 13, the operator 1490 may rotate the hand crank 140 to let out the wire rope 146 until the second upright assembly 120a of the wheel latching frame 740 embraces at least a portion of the wheel 1306 such that: (a) at least a portion of the upright members (521-523) and the guard member 122 engage the wheel 1306, and (b) at least a portion of the wheel 1306 is clamped or disposed between the second upright assembly 120a of the wheel latching frame 740 and the pair of base legs 313 of the main frame 720 with the base legs 313 of the main frame 720 providing a fulcrum on which the wheel 1306 may be pivoted from the horizontal position to the upright position.

After pivoting the wheel latching frame 740 to the latching position 1302 such that the second upright assembly 120a embraces at least a portion of the wheel 1306, the operator 1490 may strap the wheel 1306 to the second upright assembly 120a using a tie-down strap 1303. For example, the tie-down strap 1303 may be removably coupled to the latching plate 124 of the wheel latching frame 740 using fasteners (e.g., hooks 1304) that are passed through the latching apertures 506 of the latching plate 124. The tie-down strap 1303 may be tightened to secure the wheel 1306 to the second upright assembly 120a. The operator 1490 may unlock the foot rest member 126 from the transport position 1200, e.g., by removing locking pin 128, adjust the foot rest member 126 from the transport position 1200 to the lifting position 163, and lock the foot rest member 126 in the lifting position 163 using the locking pin 128. As illustrated in FIG. 14, the operator 1490 may step or stand on the foot rest plate 169 of the foot rest member 126 to use the body weight of the operator 1490 as a counterbalance to the weight of the wheel 1306 that is to be righted to the upright position.

Figure 15:
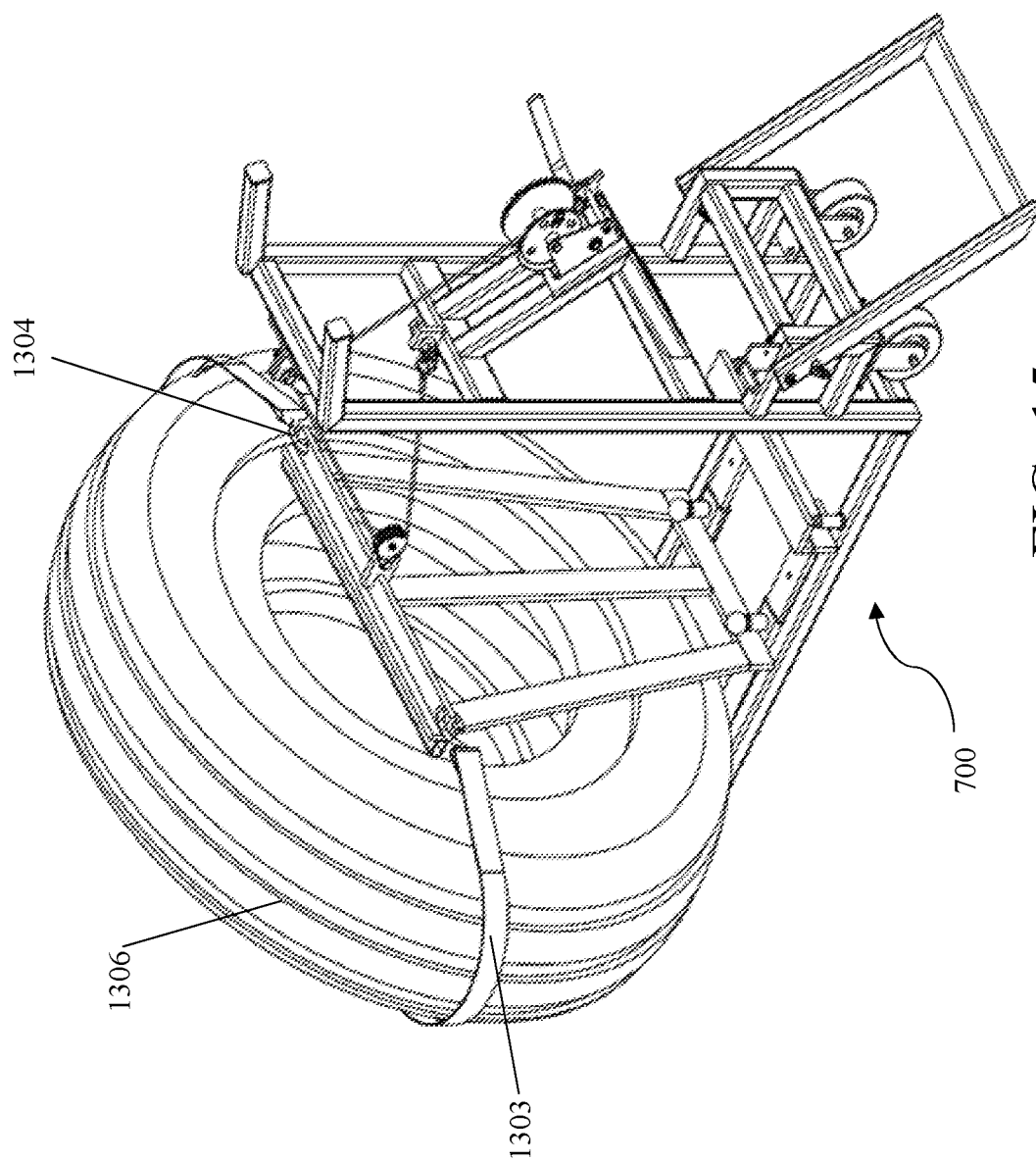

Once the wheel 1306 is securely coupled to the second upright assembly 120a of the wheel latching frame 104 and the operator 1490 is standing on the foot rest plate 169 of the foot rest member 126, the operator 1490 may rotate the hand crank 140 of the winch 138 to pull in the wire rope 146, which in turn pivots the wheel latching frame 740 from the latching position 1302 to the stowage position 101 and lifts the wheel 1306 from the horizontal position to the upright position as illustrated in FIG. 15. As described above, the wheel 1306 pivots relative to the base legs 313, with the base legs 313 providing a fulcrum on which the wheel 1306 pivots from the horizontal position to the upright position.

The operator 1490 may transport the wheel 1306 in the upright position to any desired location using the apparatus 700. For example, the operator 1490 may roll the apparatus 700 with the wheel 1306 strapped thereto to the desired location using the swivel casters 150. As such, the wheel and stand subframe 208 and the swivel casters 150 coupled thereto may be configured to handle the weight of the wheel 1306. Alternatively, the operator 1490 may roll the wheel 1306 manually off of the apparatus 700 and to the desired location.

In certain example embodiments, once the wheel 1306 is righted to the upright position, the wheel 1306 may be transferred to a wheel dolly (not shown) for transportation to a desired location. The width of the apparatus 700 (e.g., distance between outer edges 475 of the pair of base legs 313) may be configured such that a wheel dolly (e.g., a wheel dolly with bifurcated legs) can be pushed all the way up to the wheel 1306 that is strapped to the second upright assembly 120a for easy transfer of the wheel 1306 to the wheel dolly. That is, the base legs 313 of the apparatus 700 may fit in between the bifurcated legs of a wheel dolly.

Further, the above-described process may be repeated in reverse order to lower the wheel 1306 that is strapped to the second upright assembly 120a from the upright position to the horizontal position, if needed. In certain example embodiments, the winch 138 may include a lock that prevents the gears and/or the hand crank 140 of the winch 138 from rotating once locked.

Figure 16:
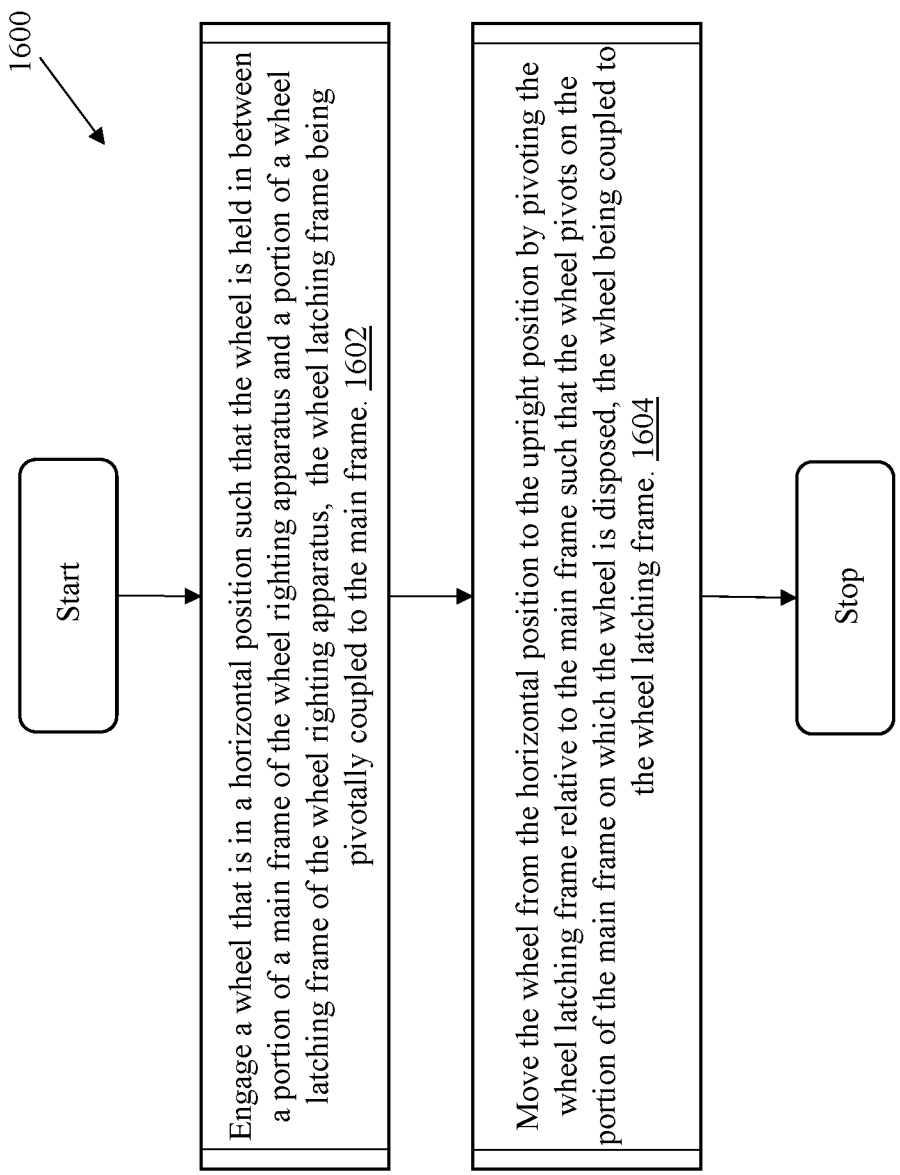
Figure 17:
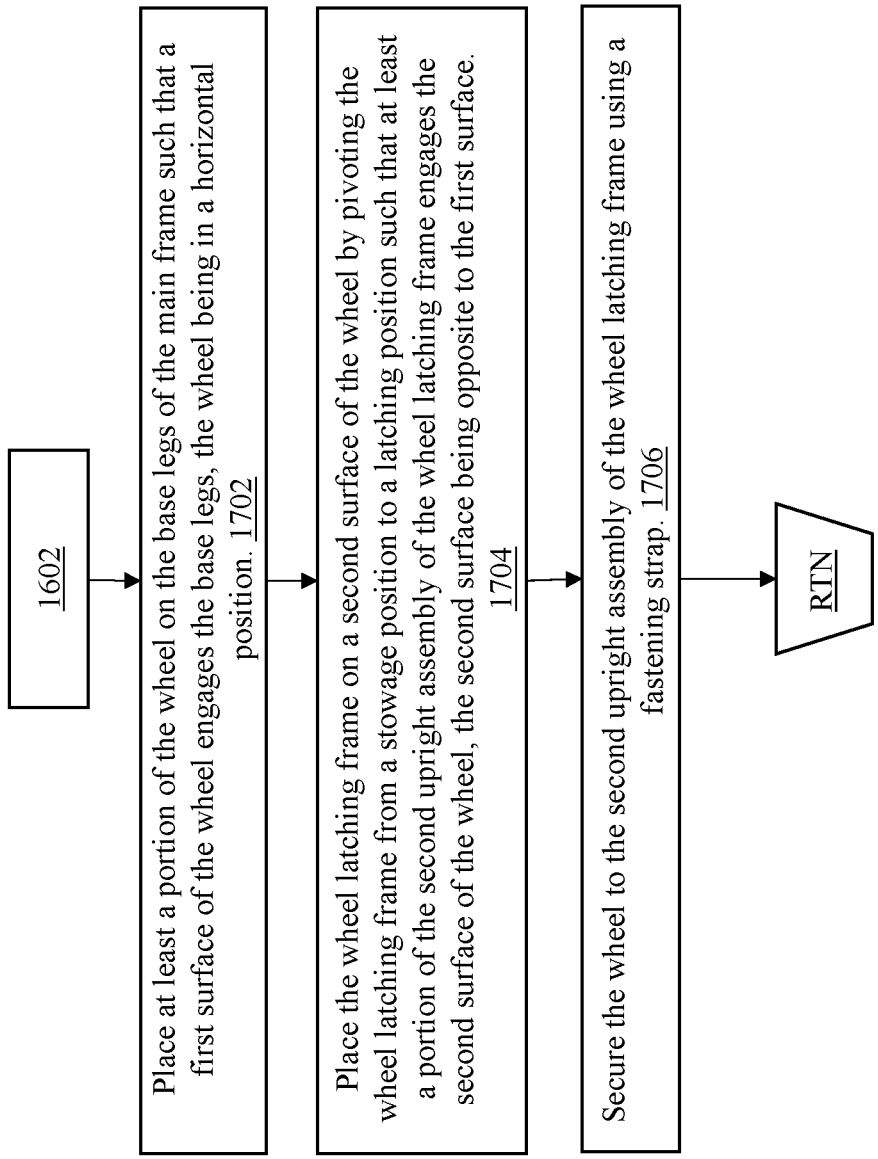

Referring to FIGS. 16-18, an example method 1600 of the wheel righting apparatus 100 (or 700) begins at operation 1602 where the wheel righting apparatus 100 (or 700) engages the wheel 1306 that is in the horizontal position. The wheel righting apparatus 100 (or 700) engages the wheel 1306 such that at least a portion of the wheel 1306 is held in between a portion of a main frame 102 of the wheel righting apparatus 100 (or 700) and a portion of a wheel latching frame 104 (or 740) of the wheel righting apparatus 100 (or 700). The wheel latching frame 104 (or 740) is pivotally coupled to the main frame 102 as described above and not repeated for the sake of brevity. Operation 1602 is described below in further detail in association with FIG. 17.

As illustrated in FIG. 17, in operation 1702, initially at least a portion of the wheel 1306 that is in a horizontal position is placed on the base legs 313 of the main frame 102 such that a first surface 1319 (e.g., a surface previously engaging a floor in the horizontal position) of the wheel 1306 engages the base legs 313. That is, pressure may be applied on the wheel righting apparatus 100 (or 700) to slide at least a portion of the base legs 313 under the wheel 1306. As such, the portion of the main frame 102 that engages the wheel 1306 in operation 1602 includes at least a portion of the base legs 313.

In operation 1704, the wheel latching frame 104 (or 740) is placed on a second surface 1329 of the wheel 1306 by pivoting the wheel latching frame 104 (or 740) from a stowage position 101 to a latching position 1302. The wheel latching frame 104 (or 740) may be pivoted from a stowage position 101 to a latching position 1302 by rotating a handle 140 of the winch 183 (clockwise or anticlockwise) to release a wire rope 146 that is coupled to the winch 183, the main frame 102, and the wheel latching frame 104 (or 740) via two pulleys (142, 144). The wheel latching frame 104 (or 740) may be placed on the wheel 1306 such that the second upright assembly 120 (or 120a) of the wheel latching frame 104 (or 740) engages the second surface 1329 of the wheel 1306. As such, the portion of the wheel latching frame 104 (or 740) that engages the wheel 1306 in operation 1602 includes the second upright assembly 120 (or 120a) of the wheel latching frame 104 (or 740). In operation 1706, the wheel 1306 may be coupled or secured to the wheel latching frame 104 (or 740), e.g., to the second upright assembly 120 (or 120a) using the tie-down strap 1303 or any other appropriate coupling mechanisms, as illustrated in FIGS. 13-14.

Returning to FIG. 16, once the wheel 1306 is disposed in between the portion of the wheel latching frame 104 (or 740) and the portion of the main frame 102 and the wheel 1306 is secured to the wheel latching frame 104 (or 740), in operation 1604, the wheel 1306 (that is secured to the wheel latching frame 104 (or 740)) is moved from the horizontal position to the upright position (shown in FIG. 15) by pivoting the wheel latching frame 104 (or 740) relative to the main frame 102. As the wheel latching frame 104 (or 740) is pivoted relative to the main frame 102, the wheel 1306 that is secured to the wheel latching frame 104 (or 740) pivots to the upright position on the portion of the main frame 102 on which the wheel 1306 is disposed. For example, the portion of the pair of base legs 313 on which the wheel 1306 is disposed may operate as a fulcrum on which the wheel 1306 pivots. Operation 1604 is described below in further detail in association with FIG. 18.

With reference to FIG. 18, in operation 1802, the foot rest member 126 of the wheel righting apparatus 100 (or 700) is set and locked in a lifting position 163. Then, in operation 1804, an operator 1490 may step on the foot rest pedal 169 to apply a body weight of the operator 1490 as a counterbalance to the weight of the wheel 1306 that is to be righted to the upright position. Further, in operation 1806, the wheel latching frame 104 (or 740) is pivoted from the latching position 1302 to the stowage position 101 by rotating the handle 140 of the winch 183. As the wheel latching frame 104 (or 740) is pivoted back to the stowage position 101, the wheel 1306 that is coupled to the wheel latching frame 104 (740) may pivot on the portion of the main frame 102, e.g., the pair of base legs 313 on which the wheel 1306 is disposed. The portion of the pair of base legs 313 on which the wheel 1306 is disposed may operate as a fulcrum on which the wheel 1306 pivots. Additionally, the righted wheel may be transported to a desired location by rolling the wheel righting apparatus 100 (or 700) using the casters 150, as described above.

It is noted that each of the main frame 102 and the wheel latching frame 104 and their respective subframes may be formed using metal tubes of any appropriate shape that are either bent or welded such that each of the main frame 102 and the wheel latching frame 104 form a single integral frame. However, in other example embodiments, each frame and their respective subframes may be formed using metal tubes that are removably coupled to each other such that the frames and subframes are modular. In one example embodiment, the metal tubes used to form the wheel righting apparatus may be hollow metal tubes to reduce a weight of the wheel righting apparatus. Further, in some example embodiments, lightening holes may be formed in the metal tubes to reduce an overall weight of the wheel righting apparatus. Furthermore, in other example embodiments, the wheel righting apparatus may be formed using any other appropriate material that is sturdy and can handle the weight of the wheel (e.g., carbon fiber) without departing from a broader scope of the present disclosure.

Though the present disclosure describes the wheel latching frame 104 as being pivotally coupled to the main frame 102 via a coupling tube 116, pivot tube 111, and a pivot rod 117 that is disposed therethrough, one skilled in the art will recognize that in other example embodiments, the wheel latching frame 104 may be pivotally coupled to the main frame 102 using any other appropriate coupling mechanism without departing from a broader scope of the present disclosure.

Though the present disclosure describes a specific shape and configuration of the winch mount subframe 134, one of skill in the art can understand and appreciate that in other example embodiments, the winch mount subframe 134 may have any other appropriate shape without departing from a broader scope of the present disclosure. Further, in other example embodiments, the winch 138 may be mounted on the main frame 102 such that a surface on which the winch 138 is disposed is substantially perpendicular to the first upright assembly 108 and not inclined as illustrated in FIGS. 1, 7, and 12. Furthermore, even though the present disclosure describes a specific configuration or design of a foot rest stop assembly 130, one of skill in the art can understand and appreciate that in other example embodiments, the foot rest stop assembly 130 may have any other appropriate configuration. Alternatively, in some example embodiments, the foot rest stop assembly 130 may be optional or any other appropriate stop mechanism may be used instead. Also, the foot rest member 126 may be optional in some example embodiments.

Even though the present disclosure describes manually operating the winch 138 using the hand crank 140 thereof, one of skill in the art can understand and appreciate that in some example embodiments, the hand crank 140 may be removed and replaced with an adapter that allows a power drill to be coupled to the winch for rotating the winch using the power drill. Further, even though the present disclosure describes the wheel righting apparatus as having two casters, one of skill in the art can understand and appreciate that in other example embodiments, the wheel righting apparatus may include fewer or more casters that are disposed at any other appropriate portion of the wheel righting apparatus without departing from a broader scope of the present disclosure. Also, even though the present disclosure describes that the handle assembly of the main frame includes a pair of handles, in other example embodiments, the handle assembly may have fewer or more handles without departing from a broader scope of the present disclosure. Further, the shoulder plate 202 may be optional in some embodiments. For example, in some embodiments of the wheel righting apparatus that do not include the shock absorbers, the wheel latching frame may not include the shoulder plate.

The wheel righting apparatus as disclosed herein may be embodied in many different forms and should not be construed as limited to the embodiments set forth herein; rather, these embodiments are provided so that this disclosure will be thorough and complete, and will fully convey the scope of the disclosure to those having ordinary skill in the art. Furthermore, all "examples" or "exemplary embodiments"

given herein are intended to be non-limiting and among others supported by representations of the present disclosure. For example, throughout the description, reference is made to numbers and shapes of components in the example embodiments. One of skill in the art will recognize that alternative example embodiments can include different numbers and shapes of the components. Without limitation, in certain alternative example embodiments, certain components depicted in this disclosure in pairs (such as the base legs 313, handles 319, shock absorbers 702, etc.) may be included in alternative example embodiments as single components (such as a single leg, single handle, and/or single shock absorber, etc.) or as more than two components.

Accordingly, many modifications and other embodiments of the present disclosure set forth herein will come to mind to one skilled in the art to which these present disclosures pertain having the benefit of the teachings presented in the foregoing descriptions and the associated drawings. Therefore, it is to be understood that the present disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. An apparatus comprising:
a main frame;
a wheel latching frame pivotally coupled to the main frame and configured to be coupled to a wheel; and
a winch assembly coupled to the main frame and operable to move the wheel from a horizontal position to a vertical position by pivoting the wheel latching frame relative to the main frame,
wherein the main frame comprises a first upright assembly and at least one leg extending substantially perpendicular to the first upright assembly, and the wheel latching frame comprises a second upright assembly and at least another leg extending substantially perpendicular to the second upright assembly, and
wherein the at least another leg of the second upright assembly is pivotally coupled to the at least one leg of the main frame.

2. The apparatus of claim 1, further comprising a foot rest member coupled to the main frame, wherein the foot rest member is configured to provide a platform to apply a counterweight to a weight of the wheel when the wheel latching frame is pivoted to move the wheel between the horizontal position and the upright position.

3. The apparatus of claim 1, wherein the apparatus further comprises at least one base leg that defines a fulcrum on which the wheel pivots when the winch assembly moves the wheel from the horizontal position to the vertical position.

4. The apparatus of claim 1, wherein the wheel latching frame is pivotable between a stowage position and a latching position, the latching position corresponding to the horizontal position, and the stowage position corresponding to the vertical position,
wherein, in the latching position, the wheel latching frame extends away from the main frame such that the wheel latching frame defines a cantilever structure extending from the main frame.

5. The apparatus of claim 4, further comprising at least one shock absorber configured to absorb impact when the wheel latching frame is pivoted from the latching position to the stowage position.

6. The apparatus of claim 1, wherein the wheel latching frame comprises a latching plate configured to receive a tie-down strap, the tie-down strap being configured to strap the wheel to the wheel latching frame.

7. The apparatus of claim 1, wherein the main frame comprises a first upright assembly and a base assembly extending substantially perpendicular to the first upright assembly, in a first direction on a first side of the first upright assembly, and
wherein the winch assembly is disposed on a second side of the first upright assembly that is opposite to the first side.

8. The apparatus of claim 1, wherein the winch assembly comprises:
a winch coupled to the main frame;
a first pulley coupled to the main frame; and
a second pulley coupled to the wheel latching frame,
wherein the apparatus further comprises a rope coupled to the winch and extending through the first pulley and second pulley.

9. The apparatus of claim 1, wherein the second upright assembly is adjustably coupled to the at least another leg of the wheel latching frame such that the second upright assembly is configured to slide along the at least another leg.

10. The apparatus of claim 1:
wherein the wheel latching frame is pivotable between a stowage position and a latching position,
wherein, in the latching position, the second upright assembly is substantially perpendicular to the first upright assembly, and
wherein, in the stowage position, the second upright assembly is substantially parallel to the first upright assembly.

11. An apparatus comprising:
a main frame comprising:
a first upright assembly, and
at least one leg extending substantially perpendicular to the first upright assembly;
a wheel latching frame configured to be coupled to a wheel and comprising:
a second upright assembly, and
at least another leg extending substantially perpendicular to the second upright assembly; and
a winch assembly coupled to the main frame and operable to move the wheel from a horizontal position to a vertical position by pivoting the wheel latching frame from a latching position to a stowage position,
wherein, in the latching position, the second upright assembly is substantially perpendicular to the first upright assembly,
wherein, in the stowage position, the second upright assembly is substantially parallel to the first upright assembly, and
wherein the at least one leg of the main frame defines a fulcrum on which the wheel pivots when the winch assembly moves the wheel from the horizontal position to the vertical position.

12. The apparatus of claim 11, further comprising a foot rest member coupled to the main frame, wherein the foot rest member is configured to provide a platform to apply a counterweight to a weight of the wheel when the wheel latching frame is pivoted to move the wheel between the horizontal position and the upright position.

13. The apparatus of claim 11:
wherein, in the latching position, the wheel latching frame extends away from the main frame such that the wheel latching frame defines a cantilever structure that extends from the main frame, and wherein, in the stowage position, the wheel latching frame is disposed adjacent the main frame such that the second upright assembly rests on the at least one leg of the main frame.

14. The apparatus of claim 11: wherein the winch assembly comprises:

a winch coupled to the main frame;

a first pulley coupled to the main frame; and a second pulley coupled to the wheel latching frame, wherein the apparatus further comprises a rope coupled to the winch and extending through the first pulley and the second pulley.

15. A method, comprising:

pivoting a wheel latching frame relative to a main frame to move the wheel latching frame from a stowage position to a latching position;

securing a wheel to the wheel latching frame, the wheel being held in a horizontal position when the wheel latching frame is in the latching position;

pivoting the wheel from the horizontal position to a vertical position by pivoting the wheel latching frame relative to the main frame from the latching position to the stowage position using a winch assembly coupled to the main frame; and engaging a first surface of the wheel by at least a portion of the main frame so that the engaged first surface of the wheel rests on the at least a portion of the main frame, wherein the step of pivoting the wheel latching frame comprises pivoting an upright assembly of the wheel latching frame such that the upright assembly engages a second surface of the wheel, the second surface being opposite to the first surface.

16. The method of claim 15, wherein the step of pivoting the wheel further comprises counterbalancing a weight of the wheel by applying a counterbalancing weight on a foot rest coupled to the main frame.

17. The method of claim 16, wherein the counterbalancing weight comprises a body weight of an operator stepping on the foot rest.

\* \* \* \* \*